United States Patent [19]
Schillo

[11] 3,967,074
[45] June 29, 1976

[54] TELEPHONE STATION IDENTIFICATION SYSTEM

[75] Inventor: Robert Frederick Schillo, Granville, Ohio

[73] Assignee: Bell Telephone Laboratories, Incorporated, Murray Hill, N.J.

[22] Filed: June 30, 1975

[21] Appl. No.: 591,892

[52] U.S. Cl. .................................. 179/18 FH
[51] Int. Cl.² ................ H04M 15/06; H04Q 3/72
[58] Field of Search .............. 179/18 FH, 7 R, 8 R, 179/7.1 R, 7.1 TP, 7 MM, 18 GE, 18 GF, 17 R, 17 A

[56] References Cited
UNITED STATES PATENTS

| | | | |
|---|---|---|---|
| 2,490,441 | 12/1949 | Joel, Jr. .............................. | 179/8.5 |
| 3,071,650 | 1/1963 | Cahill et al. ........................ | 179/8.5 |
| 3,862,374 | 1/1975 | Evers ................................ | 179/18 FH |
| 3,925,623 | 12/1975 | Tysseland ......................... | 179/18 FH |

*Primary Examiner*—Thomas A. Robinson
*Attorney, Agent, or Firm*—D. A. Marshall

[57] ABSTRACT

A telephone station identification system arranged to identify directory numbers assigned a plurality of telephone stations concurrently served by telephone offices of a switching system. Groups of telephone office lines are asynchronously scanned to detect ones of the lines selectively coupled to served telephone stations. Apparatus identifies telephone offices serving telephone stations by applying signals during a first clock sequence to scanned office lines coupled to telephone stations and registering ones of the signals as an identity of the telephone offices serving the telephone stations. The apparatus selectively reapplies the signals during a second clock sequence to each scanned call handling office line within an identified telephone office and sequentially generates the directory number digits assigned each telephone station currently served by the identified telephone offices.

24 Claims, 13 Drawing Figures

TELEPHONE STATION IDENTIFICATION SYSTEM

BACKGROUND OF THE INVENTION

This invention relates to an arrangement for identifying telephone stations served by telephone switching systems. Telephone switching centers of the telephone direct distance dialing network are equipped with switching systems each arranged to define a plurality of telephone offices serving particular ones of the telephone stations of the switching system. For example, a telephone switching center may comprise a number of switching systems, such as step-by-step and crossbar, each arranged to define telephone offices identified by a telephone office code and arranged to serve particular telephone stations. The telephone switching centers employ automatic message accounting equipment to automatically identify directory numbers assigned calling telephone stations in order that a telephone customer may be properly billed for use of telephone service.

Prior art automatic message accounting equipment provided for use in telephone switching centers initiates a request to identify a calling telephone station by applying a signal to trunk and junctor circuits which in turn conduct the signal to the calling telephone line circuit. A sleeve lead at the line circuit is connected from a main distributing frame to a station identifier matrix common to all telephone stations served by one telephone office of the telephone switching system. The telephone office station identifier matrix responds to the signal appearing on a sleeve lead by generating signals on ones of a plurality of digit leads identifying the directory number digits assigned the calling telephone station.

The telephone office station identifier matrix, being common to all telephone stations of a telephone office, is arranged to respond to an identification request signal by providing one telephone directory number identification at a time. In a telephone switching center equipped with a switching system having a plurality of telephone offices the prior art automatic message accounting equipment identifies a calling telephone station by sequentially searching through the digit leads of all telephone office station identifiers assigned to every telephone office of the switching system to locate the directory number digit signals of one calling telephone station. The searching process from one telephone office station identifier to another to identify one calling telephone station requires a large amount of the time required to complete the calling telephone station identity process.

In addition to identifying the directory numbers of telephone stations utilized for placing toll calls, many telephone switching centers are also required to identify telephone stations placing local calls. Identification of both local and toll calling telephone stations presents prior art automatic message accounting systems with a telephone station identification workload greatly in excess of the capabilities of the present toll telephone station identification systems.

Accordingly, a need exists in the art for an identification system arranged to identify a number of telephone stations currently placing calls through the telephone offices of a telephone switching center. A need also exists for a telephone station identification system arranged to identify a plurality of calling telephone stations within a specific interval of time selected to decrease the time previously required to identify a calling telephone station.

SUMMARY OF THE INVENTION

In the exemplary embodiment of the invention, a system is arranged to identify telephone stations currently served by ones of a plurality of telephone offices. The identification system is arranged to selectively scan groups of telephone office lines selectively coupled to telephone stations and which are utilized for interconnecting the telephone stations with other telephone stations. Apparatus of the identification system is arranged to identify during a first interval of time ones of the telephone offices currently serving call handling ones of the telephone stations. During a second interval of time the apparatus sequentially records and generates the identity of telephone stations coupled to each call handling line served by the previously identified telephone offices.

Groups of telephone office lines are asynchronously scanned to locate ones of the telephone office lines utilized in establishing call connections with served telephone stations. Call signals denoting ones of the scanned telephone office lines connected with served telephone stations are recorded and utilized to initiate the identification of each served telephone station. First cyclic counting apparatus identifying each group of scanned telephone office lines responds to recording of the call signals by enabling counting apparatus to establish a first sequence of time intervals during which outputs of telephone office apparatus for identifying directory numbers assigned to each telephone station served by the telephone office are selectively coupled with recording memory apparatus. During the first sequence of time intervals, the first cyclic counting apparatus identifies each group of scanned telephone office lines having a line connected with a served telephone station. Second cyclic counting apparatus controls apparatus to apply a predetermined number of cycles of tone signals to each call handling telephone office line to enable the memory apparatus to register the identity of each telephone office serving telephone stations.

The first cyclic counting apparatus after identifying each telephone office serving call handling lines initiates a second sequence of time intervals by enabling the counting apparatus to successively couple the directory number identifying apparatus of each identified telephone office with station number multiplex transmitting apparatus. The second cyclic counting apparatus again controls the application of a predetermined number of cycles of tone signals to each call handling line to enable the station number multiplex transmitting apparatus to sequentially generate and transmit to recording apparatus serial digits of the directory numbers assigned active telephone stations served by the telephone offices previously identified during the first time intervals.

In accordance with one feature of the invention, apparatus of a telephone station number identification system is arranged to identify ones of asynchronously scanned groups of telephone office lines during first and second time sequences having lines selectively coupled with telephone stations currently served by telephone offices of a switching system. Other apparatus is selectively enabled during both the first and second time sequences to apply a signal to the ones of the telephone office lines coupled with active or served telephone stations. Additional apparatus responds to signals applied during the first time sequence by registering identities of telephone offices serving the active telephone stations. Signals applied during the second time sequence enables apparatus to sequentially identify active telephone stations currently served by the telephone offices identifed during the first time sequence.

In accordance with another feature of the invention, first cyclic counting apparatus is provided for use with a telephone station identification system to identify during first and second time sequences ones of asynchronously scanned groups of telephone office lines selectively coupled to telephone stations served by a plurality of telephone offices. Second cyclic counting apparatus is enabled during the first and second time intervals to selectively apply a predetermined number of cycles of tone signal to each telephone office call handling line. Counting apparatus responsive to the first cyclic counting apparatus and arranged to identify the telephone offices controls apparatus in accordance with tone signals applied during the first time sequence to register the identity of telephone offices serving telephone stations. Other apparatus controlled by the counting apparatus sequentially and serially generates during the second time sequence the directory number of telephone stations served by telephone offices whose identities were registered during the first time sequence.

In accordance with still another feature of the invention, detector apparatus is provided for use with a telephone station identification system to decode a predetermined number of cycles of tone signal applied by cyclic counting controlled apparatus to a telephone office line into digital signals. The cyclic counting controlled apparatus enables memory apparatus during a first sequence of time intervals to register one of the digital signals as an identity of a telephone office serving a telephone station selectively coupled to the telephone office line. During a second sequence of time intervals the cyclic counting controlled apparatus enables multiplex transmitting apparatus to respond to ones of the digital signals by sequentially and serially generating directory number signals of calling telephone stations served by identified telephone offices of a switching system.

In accordance with a further feature of the invention, apparatus is provided for use in translating a tone signal appearing on an input lead cross-connected to a calling telephone station line into tone signals appearing on ones of thousands, hundreds, tens, and units designated output leads identifying directory number digits assigned calling telephone stations served by a switching system telephone office. Cyclic controlled counting apparatus generates enabling signals to control selector apparatus during a first time interval to selectively connect thousands output leads of one telephone office station identifier apparatus, the hundreds output leads of another telephone office station identifier apparatus and the tens and units output leads of yet other telephone office station identifier apparatus with memory apparatus controlled to register a signal appearing on one output lead as an identity of a telephone office serving calling telephone stations. The cyclic controlled counting apparatus subsequently generates other enabling signals to control selector apparatus to connect the thousands, hundreds, tens, and units output leads of each telephone office station identifier apparatus associated with a previously identified telephone office with multiplex transmitting apparatus arranged to sequentially and serially generate during a second time interval, directory numbers of calling telephone stations served by each identified telephone office.

DESCRIPTION OF THE DRAWING

The foregoing objectives and advantages, as well as others of the drawings, will be more apparent from a description of the drawing in which.

Figure 1:
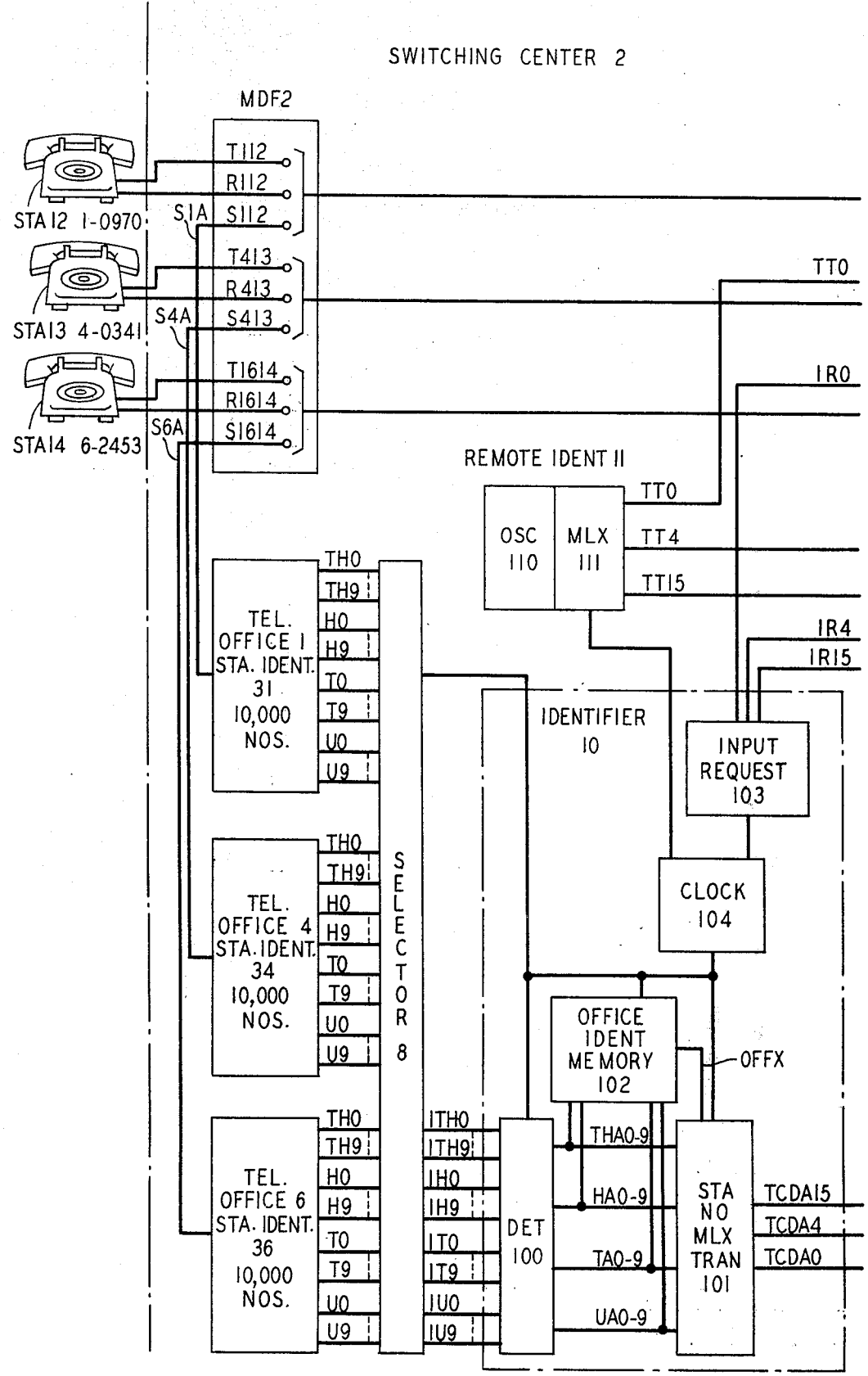
FIGS. 1 and 2, when arranged in accordance with FIG. 12, set forth a block diagram showing the relationship of the various components of an illustrative embodiment of the invention.

The detailed logic circuitry of the telephone identification system, set forth in FIGS. 3 through 11 of the drawing, is preformed by combination of logic gates, clocks, and flip-flop registers, the operation and schematic representation of which are well-known in the art and are described in detail by J. Millman and H. Taub in the textbook *Pulse, Digital and Switching Waveforms*, 1965, McGraw-Hill, Inc. It will be noted that FIGS. 2, 10 and 11 employ a type of notation referred to as "Detached Contact" in which an "X," shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer, in the September, 1955 publication of *American Institute of Electrical Engineers Transactions, Communications and Electronics*, Vol. 74, pgs. 505–513.

GENERAL DESCRIPTION

Figure 2:
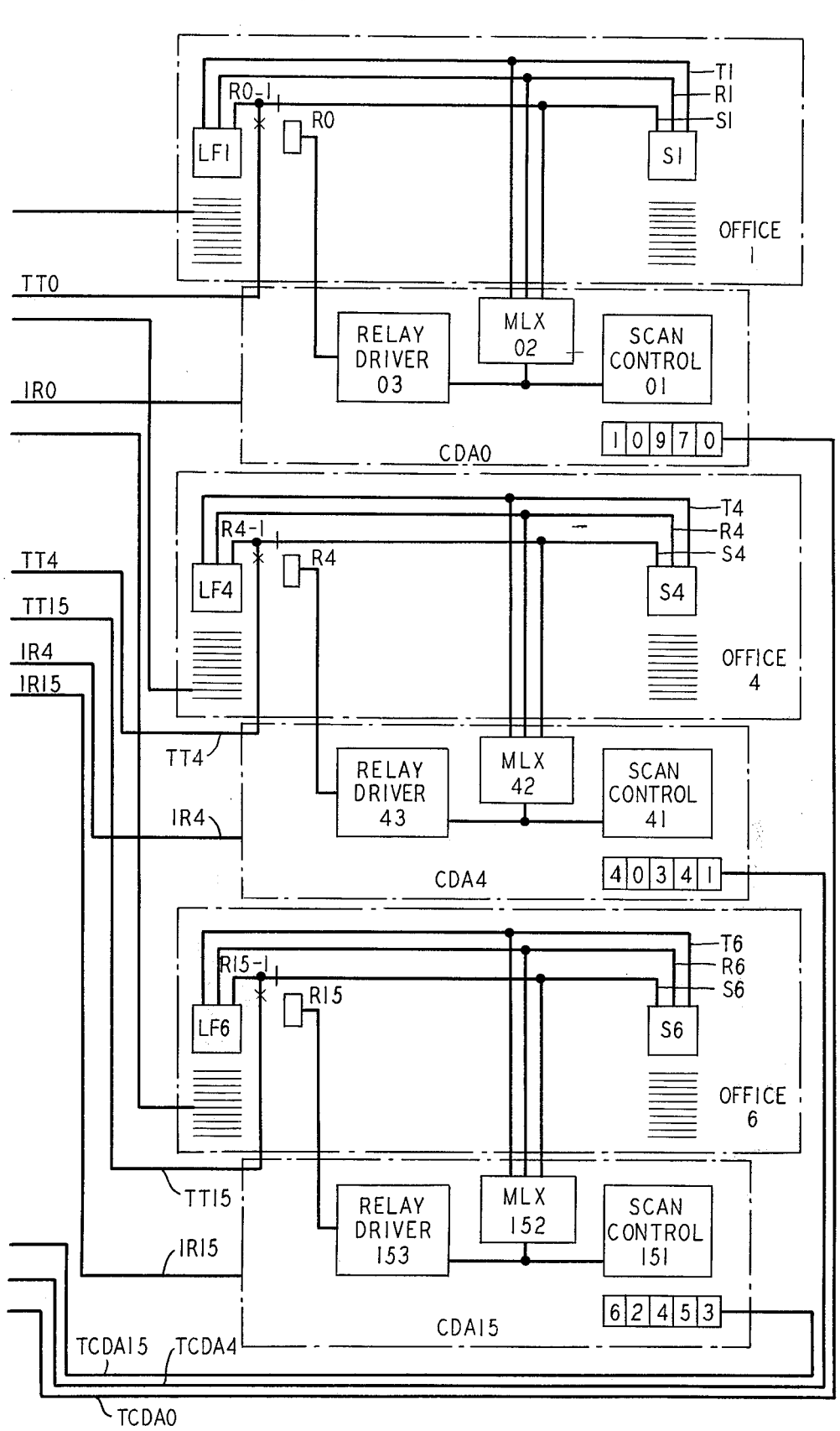

Referring now to FIGS. 1 and 2 of the drawing, it is intended that the telephone station identification system shown thereon be associated with conventional telephone switching systems of the type commonly referred to as a step-by-step switching system. The present invention is not limited for use with a telephone system of this type but may also be advantageously utilized with other types of switching systems.

As set forth in FIGS. 1 and 2, switching center 2 is intended to be comprised of a plurality of step-by-step switching systems each defining a plurality of telephone offices each having a unique telephone office code and each herein represented as telephone offices 1 through 7 of which only telephone offices 1, 4, and 6 are shown for sake of clarity. Each telephone office, for example telephone office 1, serves a plurality of telephone stations, such as telephone station 12, connected by station conductors to terminals T112, R112 of main distributing frame MDF2 of switching center 2. Main distributing frame MDF2 is utilized to cross-connect station line conductors with a line finder switch LF1 that may be cross-connected to serve as many as 200 telephone stations. A line finder switch LF1 is coupled by a telephone office line T1, R1, S1 to a selector switch S1 and responds to a calling telephone station off-hook signal by selectively connecting the calling telephone station over telephone office line T1, R1, S1 with selector switch S1.

Switching center 2 is provided with a plurality of call data accumulator circuits CDA0 through CDA15 of which only CDA0, CDA4, and CDA15 are shown. Call data accumulator circuits are arranged to accumulate call billing data pertaining to a calling telephone station and to transmit the call billing data accumulated for each telephone call connection over data links to a remote automatic message accounting recording center. Each call data accumulator, such as call data accumulator CDA0, is coupled by means of a plurality of high impedance monitor leads to a number of telephone office lines T1, R1, S1 of a switching system. A call data accumulator CDA0 is provided with a scan control 01 independently arranged to direct multiplex 02 to continuously scan each monitored telephone office line T1, R1, S1 to detect the presence and current status of an established call connection.

Sleeve terminals S112, S413, S1614, appearing on main distributing frame MDF2, and respectively coupled to telephone station line appearances on line finders LF1, LF4, LF6 are cross-connected to telephone office station identifiers 31, 34, 36. Each telephone office station identifier 31, 34, 36 is uniquely associated with one of the telephone offices defined by the switching system and is arranged to identify directory numbers assigned to telephone stations served by each telephone office. A telephone office station identifier, such as telephone office 1 station identifier 31, responds in the well-known manner to a signal appearing on sleeve terminal S112 by generating directory number signals on one of 10 thousands leads TH0 through TH9, one of 10 hundreds leads H0 through H9, one tens leads T0 through T9, and one units lead U0 through U9. The 40 directory number output leads of each telephone office station identifier 31, 34, 36 are coupled to selector 8 which is arranged to selectively interconnect these output leads with thousands leads 1TH0 through 1TH9, hundreds leads 1H0 through 1H9, tens leads 1T0 through 1T9, and units leads 1U0 through 1U9 extending to identifier 10.

Telephone station 12 originates a call when the switch hook thereof is removed by causing an off-hook signal to appear in the well-known manner across terminals T112, R112. Line finder LF1, of telephone office 1 serving calling telephone station 12, responds to the off-hook signal by moving off-normal to locate the telephone station line appearance coupled with calling telephone station 12 through terminals T112, R112 in order that calling telephone station 12 may be connected over telephone line T1, R1, S1 with selector switch S1. Selector switch S1 connects dial tone to telephone office line T1, R1 and responds to directory number signals dialed from calling telephone station 12 by enabling successive switches within switching center 2 to establish a call connection with a called telephone station. Similarly, call connections are established from calling telephone stations 13, 14 through line finder switches LF4 and LF6, respectively, of serving telephone offices 4, 6 independently over lines T4, R4, S4 and T6, R6, S6 through selector switches S4, S6 to local or remote called telephone stations.

Scan control 01, 41, 151 of each call data accumulator CDA0, CDA4, CDA15 independently directs associated multiplex 02, 42, 152 to continuously scan telephone office lines of telephone offices 1, 4, 6. When a call data accumulator circuit, for example CDA0, detects that scanned telephone line T1, R1, S1 is handling a call connection, a call signal is transmitted over lead 1R0 to identifier 10 and registered in input request 103. Similarly, call data accumulators CDA4, CDA15 detects the presence of telephone calls currently appearing on telephone office lines T4, R4, S4 and T6, R6, S6 and transmits call signals respectively over leads 1R4 and 1R15 to be registered by input request 103 of identifier 10.

The registration of call signals by input request 103 enables clock 104 to initiate a first sequence of fixed time intervals each of which is defined by the frequency of oscillator 110. At a first one of the fixed time intervals clock 104, in a manner hereinafter described in detail, directs selector 8 to connect thousands leads TH0 through TH9 of telephone office 1 station identifier 31, the hundreds leads H0 through H9, the tens leads T0 through T9, respectively, of telephone office 2 and 3 station identifiers 32, 33 and the units leads U0 through U9 of telephone office 4 station identifier 34 with output leads 1TH0 through 1TH9, 1H0 through 1H9, 1T0 through 1T9, and 1U0 through 1U9 extending to detector 100 of identifier 10.

Clock 104 advances through the first sequence of time intervals such that each time interval defines ones of the groups of telephone office lines asynchronously scanned by call data accumulators CDA0 through CDA15. During each time interval defining a group of telephone office lines having a call handling line, such as telephone office line T1, R1, S1, clock 104 controls multiplex 111 of remote identifier 11 to apply 10 cycles of tone signal from oscillator 110 to a lead extending to a call data accumulator such as lead TT0. Call data accumulator CDA0 upon detecting the presence of a call handled by scanned telephone office line T1, R1, S1, directs relay driver 03 to operate relay R0 and thereby close the make portion of transfer contacts RO-1 to connect lead TT0 with sleeve lead S1. The 10 cycles of tone signal applied to sleeve lead S1 of telephone office line T1, R1, S1 appears at terminals S112 on main distributing frame MDF2 and is transmitted over lead S1A to telephone office 1 station identifier 31.

Telephone office 1 station identifier 31 is arranged in the well-known manner so that a tone signal appearing on a lead cross-connected to a calling telephone station line is translated into a plurality of tone signals appearing on output leads identifying the directory number assigned the calling telephone station. Thus, the 10 cycles of tone signal appearing on lead S1A, is decoded by telephone office 1 station identifier 31 into 10 cycles of tone signal appearing on output thousands lead TH0, hundreds lead H9, tens lead T7, and units lead U0 to identify the last four directory number digits 0970 assigned calling telephone station 12.

Thousands lead TH0 of telephone office 1 station identifier 31 is connected by selector 8 under control of clock 104 to output lead 1TH0 extending to detector 100 of identifier 10. Detector 100 under control of clock 104 decodes the 10 cycles of tone signal appearing on lead 1TH0 into a digital signal and applies the digital signal to thousands lead THA0 extending to the input of station number multiplex transmitter 101 and office identity memory 102.

In the first sequence during the time interval defining the group of scanned telephone office line containing line T1, R1, S1, clock 104 controls office identity memory 102 to receive the digital signal appearing on lead THA0 and register in accordance therewith the identity of telephone office 1 currently serving calling telephone station 12. Clock 104 advances through the first sequence of time intervals to the fixed time interval identifying the group of telephone office lines containing line T4, R4, S4 and enables remote identifier 11 to apply 10 cycles of tone to lead TT4. The 10 cycles of tone signal transmitted during this time interval through the make portion of transfer contacts R4-1 over sleeve lead S4 to terminal S413 and lead S4A to telephone office 4 station identifier 34. Telephone office 4 station identifier 34 translates the applied tone signals into 10 cycles of tone that appears on output thousands lead TH0, hundreds lead H3, tens lead T4 and units lead U1 corresponding to the digits 0341 of directory number 4-0341 assigned calling telephone station 13. The 10 cycles of translated tone signal are transmitted over units lead U1 to selector 8 and output lead 1U1 to detector 100 wherein the tone signal is decoded into a digital signal and applied to lead UA1 extending to office identity memory 102. During the fixed time interval identifying the group of telephone office lines containing line T4, R4, S4, clock 104 controls office identity memory 102 to register the digital signal appearing on lead UA1 as the identity of telephone office 4 serving calling telephone station 13.

Clock 104 of identifier 10 cycles through the first sequence of fixed time intervals and controls selector 8 to connect the thousands leads TH0 through TH9 of a telephone office 5 station identifier 35, the hundreds leads H0 through H9 of telephone office 6 station identifier 36, and the tens leads T0 through T9 of a telephone office 7 station identifier 37 with output leads 1TH0 through 1TH9, 1H0 through 1H9, 1T0 through 1T9, and 1U0 through 1U9 extending to detector 100. When clock 104 advances to a fixed time interval identifying the group of scanned telephone office lines containing line T6, R6, S6, remote identifier 11 is directed to apply 10 cycles of tone signal over lead TT15 through the make portion of transfer contact R15-1 to sleeve lead S6A. The tone signal appearing on lead S6A is translated by telephone office 6 station identifier 36 into 10 cycles of tone signals on lead H4 identifying the hundreds digit 4 of directory number 6-2453 assigned calling telephone station 14. Detector 100 decodes the 10 cycles of tone signal appearing on lead 1H4 coupled to lead H4 into a digital signal applied to lead HA4 in order that clock 104 may enable office identity memory 102 to record the digital signal as the identity of telephone office 6 serving calling telephone station 14. After identifying telephone offices 1, 4, 6 currently serving calling telephone stations 12, 13, 14, clock 104 initiates a second sequence of fixed time intervals during which the directory number of calling telephone stations served by each identified telephone office is sequentially identified and serially recorded in a call data accumulator. During the second time interval sequence, cycling clock 104 directs selector 8 at the beginning of fixed intervals of time to connect the thousands TH0 through TH9, hundreds H0 through H9, tens T0 through T9, and units U0 through U9 leads of each individual telephone office station identifier with the thousands 1TH0 through 1TH9, hundreds 1H0 through 1H9, tens 1T0 through 1T9, and units 1U0 through 1U9 leads extending to detector 100 of identifier 10.

Clock 104 continues to advance through the second sequence of fixed time intervals and controls office identity memory 102 to read out the identity of each telephone office registered as serving a calling telephone station. Thus, recycling of clock 104 enables selector 8 to connect the thousands TH0 through TH9, hundreds H0 through H9, tens T0 through T9, and units U0 through U9 leads of telephone office 1 station identifier 31 with leads 1TH0 through 1TH9, 1H0 through 1H9, 1T0 through 1T9, and 1U0 through 1U9 extending to detector 100. During one of the time intervals of the second sequence, clock 104 interrogates office identity memory 102 and identifies telephone office 1 as serving a calling telephone station coupled to one of the telephone lines scanned by call data accumulator CDA0. Office identity memory 102 enables clock 104, in a manner hereinafter described in detail, to direct multiplex 111 of remote identifier 11 to again apply 10 cycles of tone signal to lead TT0 connected with sleeve lead S1 of telephone office line T1, R1, S1. The appearance of this tone signal on lead S1A enables telephone office 1 station identifier 31 to place corresponding tone signals on thousands TH0, hundreds H9, tens T7 and units U0 leads output thereof to identify directory number 0970 assigned calling telephone station 12.

Detector 100 decodes the tone signals into digital signals and applies the digital signals to leads thousands THA0, hundreds HA9, tens TA7, and units UA0 leads extending to station number multiplex transmitter 101. Office identity memory 102 also sends the identity of telephone office 1 to station number multiplex transmitter 101 in order that clock 104 may control station number multiplex transmitter 101 to select lead TCDA0 and serially transmit thereon directory number digits 1-0970 assigned calling station 12 to call data accumulator CDA0. In succeeding ones of the second sequence of time intervals, the directory numbers 4-0341 and 6-2453 assigned calling telephone stations 13, 14 are identified and serially transmitted over leads TCDA4, TCDA15, respectively, to call data accumulators CDA4 and CDA15.

It will be clear from the above general description and from the subsequent detailed description that the novel arrangement contemplated by the invention enables a plurality of calling telephone stations currently served by telephone offices of a switching system to be identified. The disclosed identification system is arranged to successively record identity of telephone offices currently serving call handling lines during a first time interval sequence and to sequentially and serially generate during second time intervals directory numbers assigned calling telephone stations coupled to each call handling line of the telephone offices identified during the first time intervals.

DETAILED DESCRIPTION

A. Station Identity Request

Referring again to FIGS. 1 and 2 of the drawing, it is intended that calling telephone stations 12, 13, 14 served by telephone offices 1, 4, 6 are currently coupled through line finders LF1, LF4, LF6 to telephone office lines T1, R1, S1; T4, R4, S4; and T6, R6, S6. It is also intended that scan controls 01, 41, and 151 have located, via their associated multiplex 02, 42, 152 each of the call handling lines and have enabled call data accumulators CDA0, CDA4, CDA15 to place call signals respectively on leads 1R0, 1R4, and 1R15 extending to identifier 10.

Figure 3:
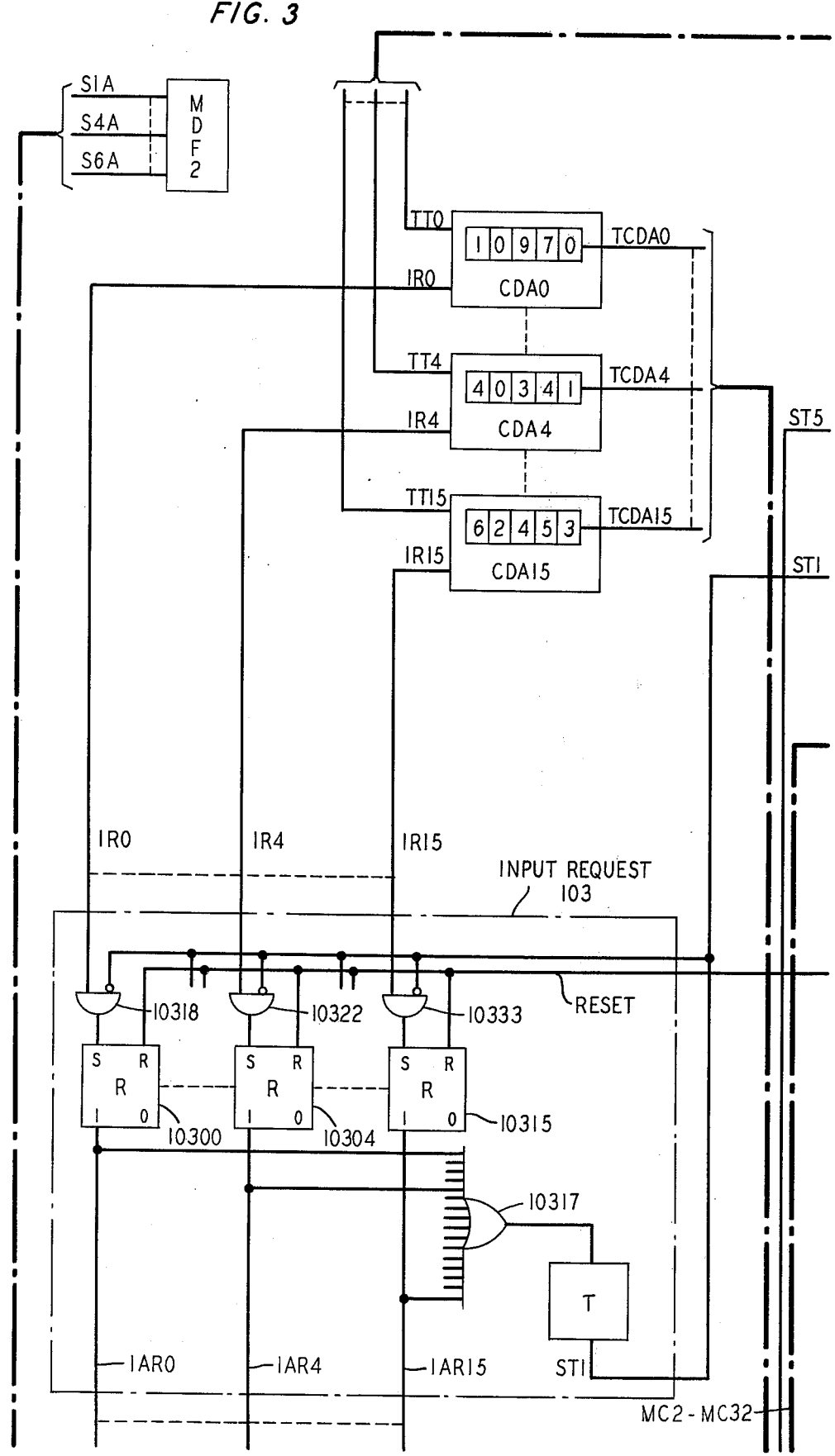
FIGS. 3 through 11, when arranged in accordance with FIG. 13, set forth the circuit details of an automatic number identification system in accordance with an illustrative embodiment of the present invention for use with a telephone switching system to identify telephone stations.

Input request 103 of identifier 10, FIG. 3, is equipped with a plurality of registers, herein designated R10300 through R10315, each of which are provided for use with one of the call data accumulators CDA0 through CDA15. A call signal appearing on lead 1R0 from call data accumulator CDA0 enables AND gate 10318 to set register R10300 indicating that one of the telephone office lines scanned by call data accumulator CDA0 is connected to a calling telephone station. Similarly, call signals appearing on leads 1R4, 1R15 enable AND gates 10322, 10333 to set their respective registers R10304, R10315. Setting of any one of registers R10300 through R10315 enables OR gate 10317 to activate timer T. Timer T may be any of a variety of timing circuits well-known in the art arranged to enable an output lead, herein designated ST1, a predetermined interval of time after the input thereof has been activated. The enablement of lead ST1 at this time inhibits remaining ones of AND gates 10318 through 10333 from setting their respective registers R10300 through R10315 in response to call signals transmitted from other call data accumulators.

B. Clock Circuit

Figure 4:
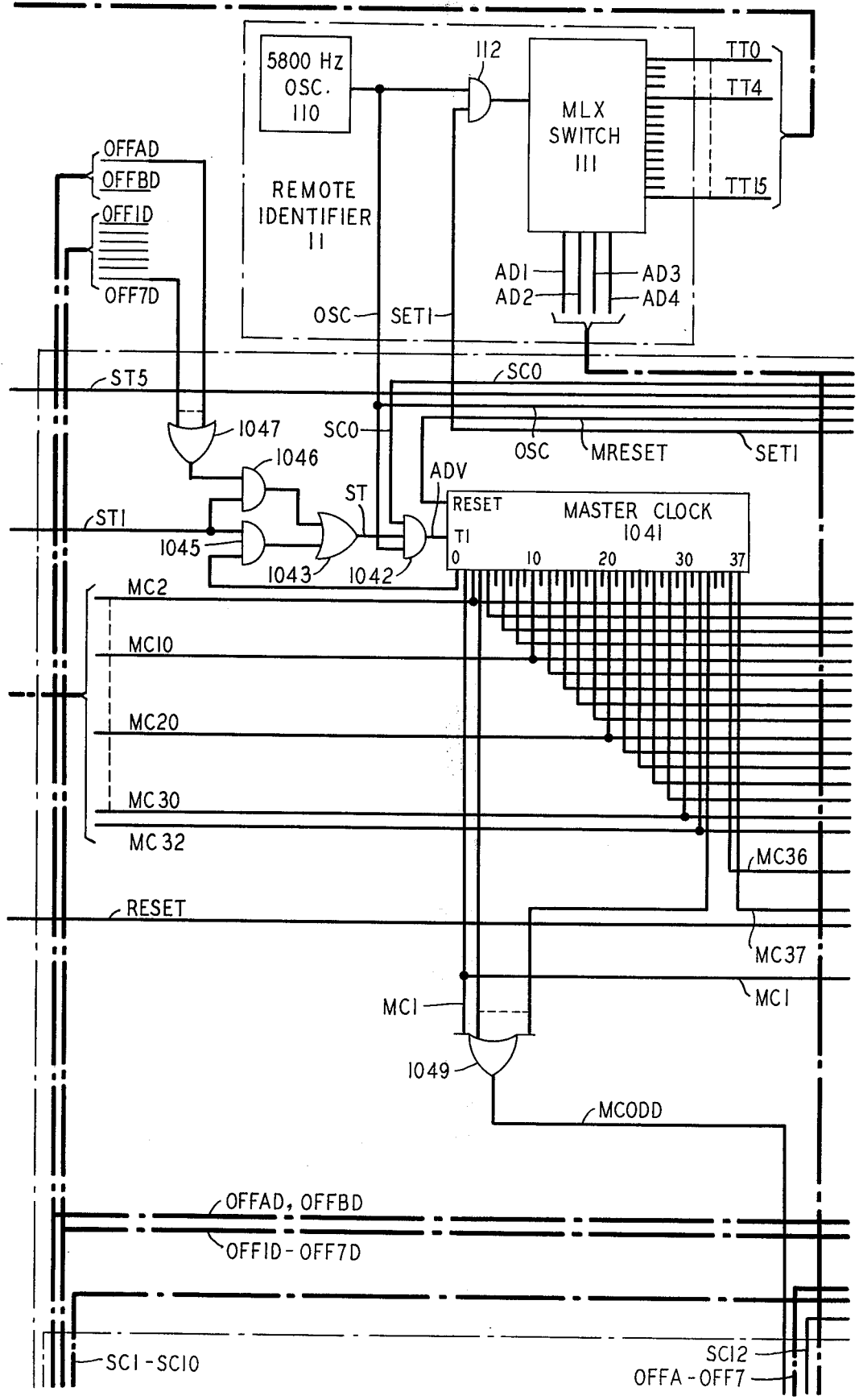
Figure 5:
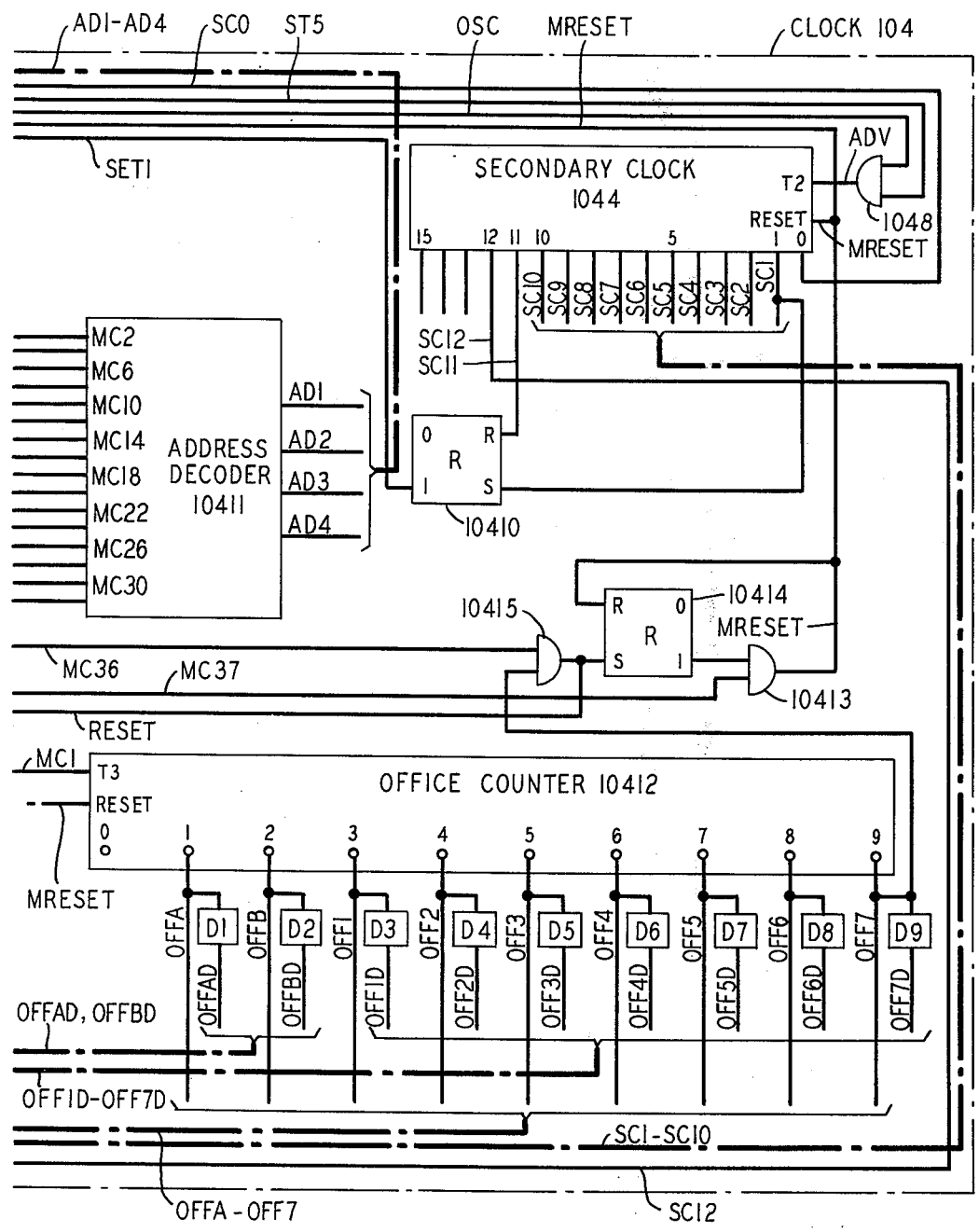
Figure 6:
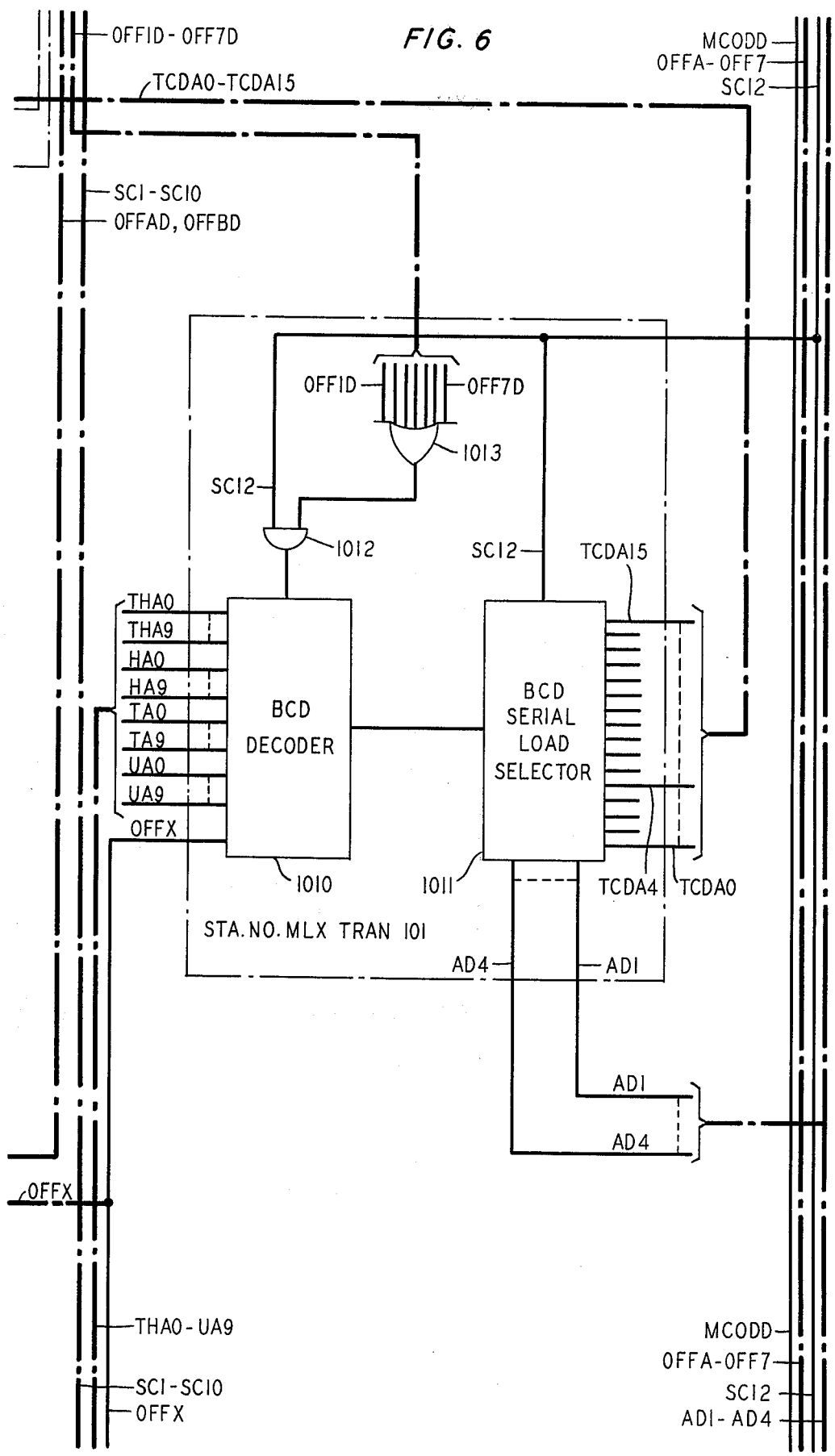

Clock 104, set forth in FIGS. 4 and 5, comprises cyclic clocks, herein designated master clock 1041 and secondary clock 1044. Each cyclic clock is arranged to respond in the well-known manner to signals appearing at the input thereof by advancing through ones of a predetermined number of states. When a cyclic clock has advanced to a final one of the states, the next signal appearing at the clock input recycles the clock to the initial state so that the sequence may be repeated.

Master clock 1041, FIG. 4, in the present embodiment of the invention is arranged to cyclically advance through 38 states. More states may be used, however, 38 states are sufficient to show operation of the present invention. Initially, master clock 1041 is set to an initial state 0 and applies an enable signal from terminal 0 to one input AND gate 1045. A first signal applied to clock input T1 advances master clock 1041 from initial state 0 to state 1. In advancing to state 1 master clock 1041 moves the enable signal from terminal 0 to terminal 1 thereby inhibiting operation of AND gate 1045. Succeeding signals applied to clock input T1 continue to advance master clock 1041 from state 1 through remaining ones of the states to state 37. When master clock 1041 has advanced to state 37 the next signal appearing at clock input T1 recycles master clock 1041 to initial state 0 in order that the sequence may be repeated.

Secondary clock 1044, FIG. 5, is similar to master clock 1041 and differs therefrom only in the number of states. Signals at clock input T2 enables secondary clock 1044 to advance through 16 states. When secondary clock 1044 has advanced to state 15, a next signal appearing at clock input T2 recycles secondary clock 1044 to the initial state 0.

In addition to master clock 1041 and secondary clock 1044, clock 104 is provided with an office counter 10412 arranged to respond to signals appearing at counter input T3 by advancing through a predetermined number of states corresponding to ones of telephone offices 1 through 7 defined by the switching system of switching center 2.

C. Identification Initiation

Initially, master clock 1041, secondary clock 1044, and office counter 10412, FIGS. 4 and 5, are set to initial state 0. With secondary clock 1044 in initial state 0, an enable signal is applied over lead SC0 to an input AND gate 1042. Similarly, another enable signal is applied from terminal 0 of master clock 1041 to an input of AND gate 1045. The enablement of lead ST1 by timer T of input request 103 operates AND gate 1045 and OR gate 1043 to enable a second input of AND gate 1042.

Remote identifier 11 is equipped with oscillator 110 arranged to place a signal, hereinafter referred to as a tone signal, on lead OSC extending to inputs of AND gates 112 and 1042. In the present embodiment of the invention, oscillator 110 is assumed to generate a tone signal of 5800 Hz. However, it is to be understood that other tone signals of different frequencies can be generated by oscillator 110 without impairment of the invention. The first cycle of tone signal appearing on lead OSC, in combination with enabling signals generated by OR gate 1043 and secondary clock 1044, control AND gate 1042 to advance master clock 1041 from initial state 0 to state 1 thereby placing an enabling signal on terminal 1 connected to lead MC1. The enabling signal appearing on terminal 1 of master clock 1041 operates OR gate 1049 to place a reset signal on lead MCODD to thereby reset the registers, FIG. 8, of 40 tone detectors 1000 through 10039. In addition to operating OR gate 1049, FIGS. 4 and 5, the enabling signal appearing on lead MC1 advances office counter 10412 from initial state 0 to state 1 thereby enabling terminal 1 connected to lead OFFA.

Figure 7:
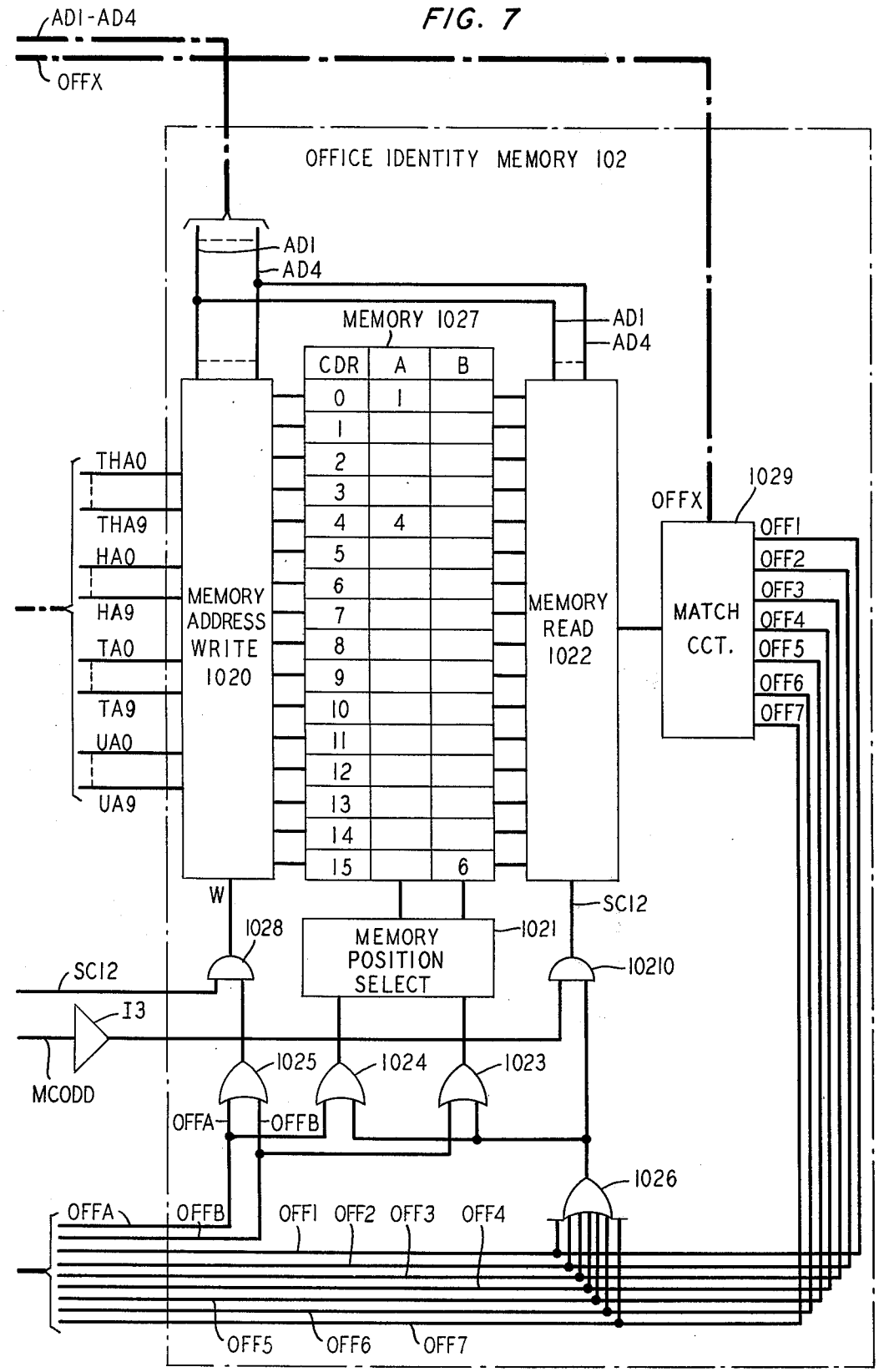
Figure 10:
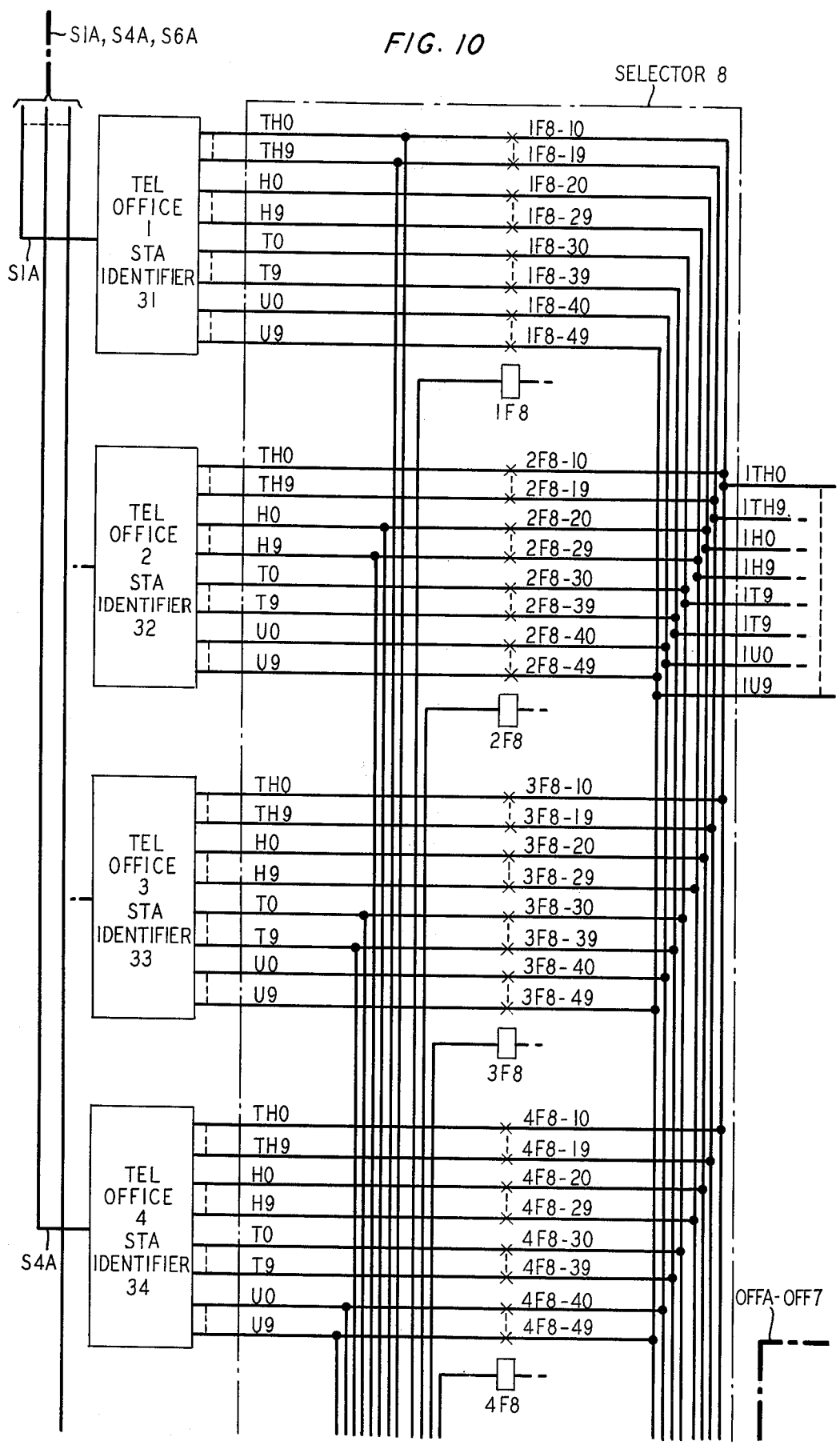
Figure 11:
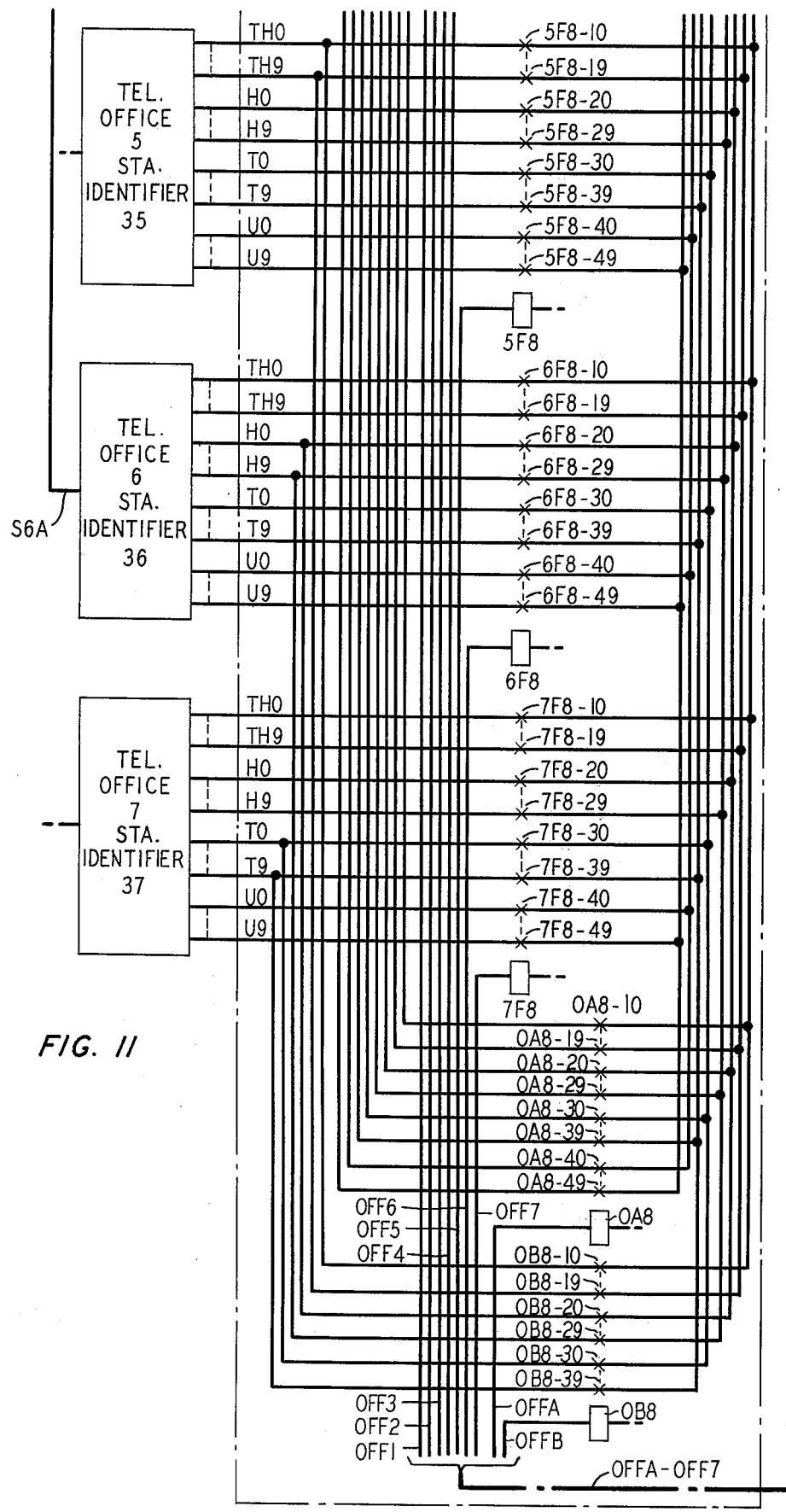
Figure 12:
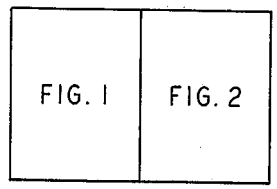
Figure 13:
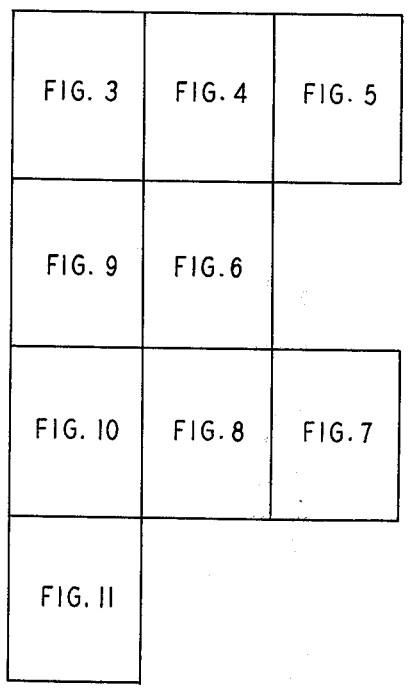

The enabling signal appearing on terminal 1 of office counter 10412 is applied to lead OFFA extending to OR gates 1025, 1024, FIG. 7, of office identity memory 102 and to selector 8, FIGS. 10 and 11. Selector 8 is coupled to telephone office station identifiers 31 through 37 and is arranged to selectively interconnect them with detector 100 of identifier 10. Each telephone office station identifier, such as telephone office 1 station identifier 31, is arranged to generate the directory numbers of telephone stations served by telephone office 1. As many as 10,000 telephone stations may be identified from a tone signal appearing on an input sleeve lead, such as sleeve lead S1A, associated with each calling telephone station. The output of each telephone office station identifier is a four digit directory number assigned each telephone station and appears as tone signals on four of 40 output leads, herein designated as thousands leads TH0 through TH9, hundreds leads H0 through H9, tens leads T0 through T9, and units leads U0 through U9.

The enabling of lead OFFA by office counter 10412 operates relay OA8 of selector 8. Relay OA8 in operating closes make contacts, herein represented as make contacts OA8-10 through OA8-19, to connect thousands leads TH0 through TH9 of telephone office 1 station identifier 31 with 10 corresponding output thousands leads 1TH0 through 1TH9. Operation of relay OA8 also operates make contacts OA8-20 through OA8-29 to connect hundreds leads H0 through H9 of telephone office 2 station identifier 32 with corresponding output hundreds leads 1H0 through 1H9. The tens leads T0 through T9 of telephone office 3 station identifer 33, and the units leads U0 through U9 of telephone office 4 station identifier 34, are connected by operation of make contacts OA8-30 through OA8-49 with corresponding ones of output tens leads 1T0 through 1T9 and output units leads 1U0 through 1U9.

The enabling of lead OFFA also operates OR gate 1025, FIG. 7, to enable an output of AND gate 1028 and OR gate 1024 to direct memory position select 1021 to control memory 1027 to register data in an A store position.

Referring again to FIGS. 4 and 5, the advancement of office counter 10412 to state 1 activates delay D1 to place an enable signal on lead OFFAD after a short interval of time. The delay enable signal appearing on lead OFFAD operates OR gate 1047 to enable an input of AND gate 1046.

D. Telephone Office Identification

The advancement of master clock 1041 to state 1 removes the enable signal to terminal 1 from terminal 0 thereby inhibiting AND gate 1045. Since an enable signal is still present on lead ST1, AND gate 1046 controls OR gate 1043 to maintain an enable signal in combination with lead SCO enable signal on an input of AND gate 1042. The next cycle of tone signal appearing on lead OSC enables AND gate 1042 to advance master clock 1041 to even state 2 and thereby place an enable signal on terminal 2 thereof.

Each even numbered state of master clock 1041 identifies a call data accumulator capable of scanning a plurality of telephone office lines of several telephone offices. Thus, the enable signal now appearing on terminal 2 of master clock 1041 is transmitted on lead MC2 to address decoder 10411 to locate a call data accumulator defined by even state 2 and to secondary clock enable 1040, FIG. 9. Secondary clock enable 1040 is provided with AND gates 10400 through 10415, each having two inputs, one of which is individually coupled to one of even numbered leads MC2 through MC32 and the other of which is individually coupled to one of the registers R10300 through 10315, FIG. 3, located in input request 103. Register R10300, having registered a call signal denoting that call data accumulator CDA0 is serving a call handling telephone office line enables one input of AND gate 10400, FIG. 9. The enabling signal placed on lead MC2 by advancement of master clock 1041 to state 2 operates AND gate 10400 to activate OR gate 10416 to enable one input of AND gate 10418. The delayed enabling signal applied to lead OFFAD by office counter 10412 causes OR gate 10417 to enable the other input of AND gate 10418 and thereby place a secondary clock start signal on lead ST5. A start signal, FIGS. 4 and 5, appearing on lead ST5, in combination with the tone signal appearing on lead OSC, enables AND gate 1048 to advance secondary clock 1044 from the initial state 0 to state 1. The removal of an enabling signal from lead SCO caused by the advancement of secondary clock 1044 to state 1 inhibits AND gate 1042 to prevent tone signals appearing on lead OSC to advance master clock 1041.

Enablement of lead MC2 by master clock 1041 is translated by address decoder 10411 into binary signals uniquely identifying call data accumulator CDA0 and applied to address leads AD1 through AD4. The address signals appearing on leads AD1 through AD4 directs multiplex switch 111 of remote identifier 11 to selectively connect the output of AND gate 112 with lead TTO extending to CDA0. These address signals, FIG. 7, also direct memory address write 1020 to selectively connect leads THA0 through THA9, HA0 through HA9, TA0 through TA9, and UA0 through UA9 with memory 1027.

When secondary clock 1044, FIGS. 4 and 5, has advanced to state 1, the enabling signal appearing on terminal 1 thereof sets register R10410 to place an enabling signal on lead SET1. This enabling signal is transmitted, via lead SET1, to remote identifier 11 to operate AND gate 112 and thereby allow oscillator 110 to apply a cycle of tone signal to lead TTO. The cycle of tone signal is transmitted, FIGS. 1 and 2, over lead TTO to call data accumulator CDA0 through the make portion of transfer contacts RO-1 to sleeve lead S1 of telephone office line T1, R1, S1. Continuing, the cycle of tone is transmitted through line finder switch LF1 to main distributing frame terminal S112 and over lead S1A, FIGS. 10 and 11, to telephone office 1 station identifier 31. Each cycle of tone signal appearing on lead S1A is translated into a cycle of tone signal simultaneously appearing on leads TH0, H9, T7, and U0, identifying the last four digits of directory number 0970 assigned calling telephone station 12. The cycle of tone signal appearing on thousands lead TH0 is transmitted through make contacts OA8-10 of operated relay OA8 and over lead 1TH0 to tone detector 100.

Figure 8:
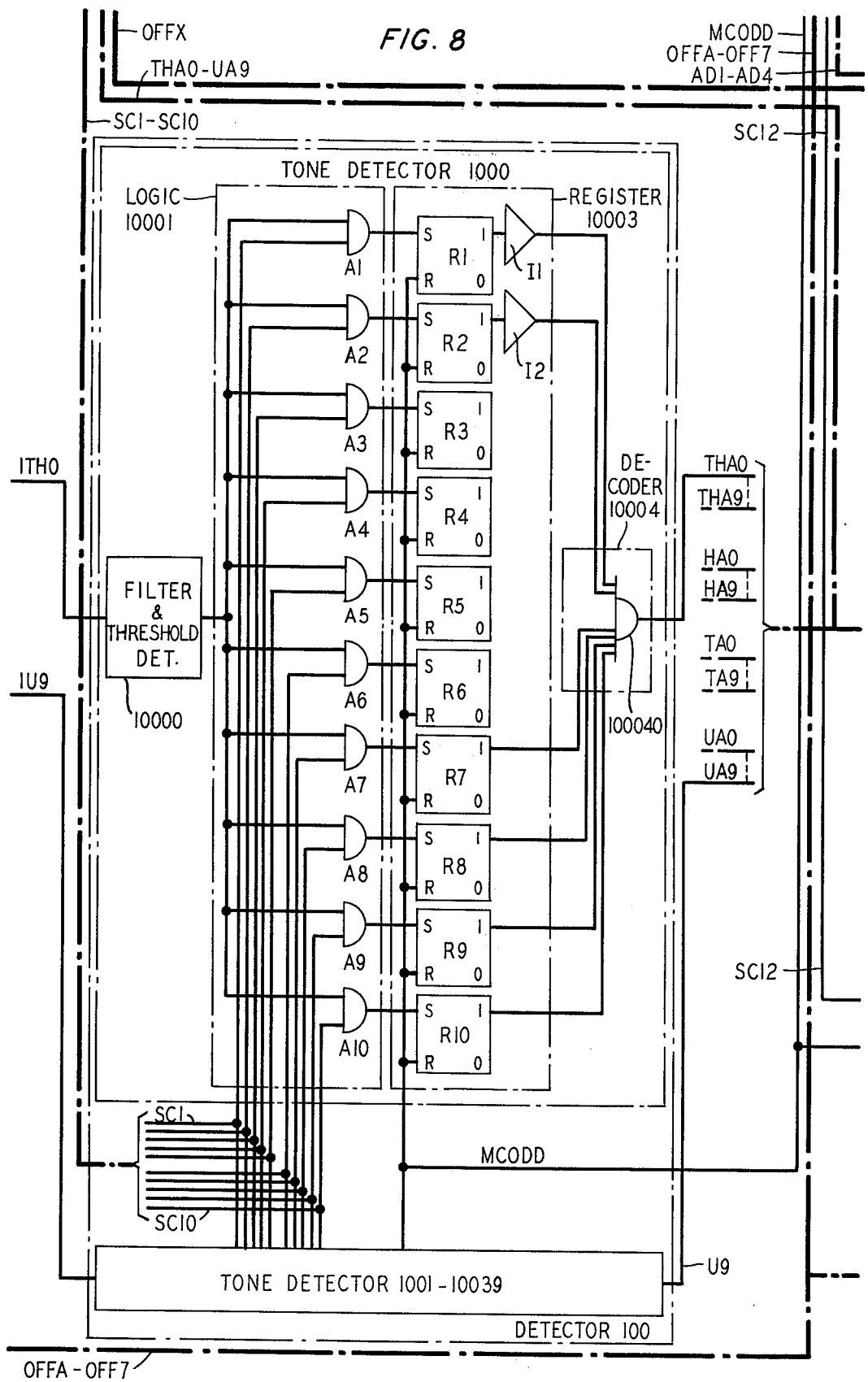

Detector 100, FIG. 8, is comprised of forty tone detectors designated 1000 through 10039 and each having logic circuity identical to the logic circuitry set forth for tone detector 1000. Each tone detector, such as tone detector 1000, is coupled to one of the 40 thousands 1TH0 through 1TH9, hundreds through 1H9, tens 1T0 through 1T9, and units 1U0 through 1U9 output leads from selector 8. An output lead, for example lead 1TH0, is connected to filter and threshold detector 1000 which has an output coupled to inputs of tens AND gates A1 through A10 of logic 10001. AND gates A1 through A10 have another input individually coupled to one of ten leads SC1 through SC10 each of which defines a state 1 through 10 of secondary clock 1044. AND gates of logic 1001 are connected to set inputs of corresponding numbered registers R1 through R10 included in register 1003. Output leads of register 10003 extend to decoder 10004 and are terminated in AND gate 100040 which has an output lead THA0.

The cycle of tone signal appearing on thousands lead 1TH0 is filtered to the frequency of oscillator 110 by filter and threshold detector 10000 and is applied to inputs of AND gates A1 through A10 when the level of the tone signal exceeds a predetermined value determined by threshold circuitry of filter and threshold detector 10000. Filter and threshold detector 10000 is constructed of circuitry well-known in the art and need not be shown in detail for an understanding of the invention. Since secondary clock 1044 is at state 1, an enable signal appears on lead SC1 which in combination with a valid output signal from filter and threshold detector 10000 enables AND gate A1 to set register R1. In the normal operation of detector 100, the transient response of filter and threshold detector 10000 is such that first and second cycles of tone signal appearing on lead 1TH0 are below the predetermined threshold level sufficient to enable inputs of AND gates A1 and A2. Thus, AND gate A1 remains in the inhibit state to prevent setting of register R1.

Referring now to FIGS. 4 and 5 of the drawing, the next cycle of tone signal appearing on lead OSC is applied to lead TTO and enables AND gate 1048 to advance secondary clock 1044 from state 1 to state 2. The resulting enabling signal applied to lead SC2 appears at one input of AND gate A2, FIG. 8, of tone detector 1000. However, since the output of filter and threshold detector 10000 is insufficient to operate AND gate A2, register R2 remains in the reset state.

Secondary clock 1044, FIGS. 4 and 5, responds to cycles of tone signal appearing on lead OSC by continuing to advance through counting states from state 2 to state 10. The cycles of tone signal also applied to lead TTO appears on lead 1THO, FIG. 8, and are coupled from the output of filter and threshold detector 10000 to inputs of AND gates A1 through A10. Advancement of secondary clock 1044 from state 2 successively enables leads SC3 through SC10 which in turn enables AND gates A3 through A10 to set their respective registers R3 through R10.

After the receipt of ten cycles of tone signals, registers R1, R2 are in their reset states and registers R3 through R6 may or may not have been set, and registers R7 through R10 have been set. Since inverters I1 and I2 are connected to the set terminals of registers R1 and R2, respectively, all the inputs of AND gate 100040 are enabled thereby allowing AND gate 100040 to place a digital signal on lead THA0 extending to memory address write 1020, FIG. 7, of office identity memory 102.

Office identity memory 102 is arranged to receive the digital signal appearing on lead THA0 and record therefrom the identity of telephone office 1 serving calling telephone station 12 in a store location of memory 1027. The address signal appearing on leads AD1 through AD4 correspond to an even state of master clock 1041 and define one of the call data accumulators CDA0 through CDA15. When master clock 1041 is set to state 2, the address signals appearing on leads AD1 through AD4 enable memory address write 1020 to define the store location in memory 1027 assigned to call data accumulator 0. The enabling signal appearing on lead OFFA when office counter 10412 has been set to state 1 indicates that the leads THA0 through THA9 are selectively coupled via tone detector 1000 with the output thousandths leads of telephone office 1 station identifier 31. Thus, the enabling signal on lead OFFA enables OR gate 1024 to set memory position select 1021 to select the A portion of the memory store location assigned to call data accumulator CDA0.

Secondary clock 1044, FIGS. 4 and 5, advances in response to the tone signals appearing on lead OSC to state 11 and enables terminal 11 to reset register 10410. Resetting register 10410 removes the enabling signal from lead SET1 and thereby inhibits AND gate 112 to remove tone signals from lead TTO. A next cycle of tone signal appearing on lead OSC advances secondary clock 1044 to state 12 to place an enabing signal on lead SC12. The enabling of lead SC12, FIG. 7, in combination with the operation of OR gate 1025 in response to the enabling signal appearing on lead OFFA, operates AND gate 1028 to enable memory address write 1020. Memory address write 1020 writes the digital signal appearing on lead THAO into the A portion of the memory store location assigned call data accumulator CDA0 as the identity of telephone office 1.

Referring again to FIGS. 4 and 5 of the drawing, succeeding cycles of tone signal appearing on lead OSC continue to advance secondary clock 1044 from state 12 through state 15. The next cycle of tone signal appearing on lead OSC recycles secondary clock 1044 to initial state 0. Advancement of secondary clock 1044 to state 0 enables lead SCO input to AND gate 1042 to allow the cycle of tone signal appearing on lead OSC to advance master clock 1041 to state 3. The resultant enabling of lead MC3, connected to terminal 3 of master clock 1041, operates OR gate 1049 to enable lead MCODD and reset the registers of tone detectors 1000 through 10039. Removal of the enabling signal from lead MC2 by master cock 1041 inhibits AND gate 10400, FIG. 9, of secondary clock enable 1040 to remove the enable signal from secondary clock start lead ST5 and thereby stop secondary clock 1044 at state 0.

E. Telephone Office Identification Sequence

A next cycle of tone signal appearing on lead OSC, FIGS. 4 and 5, advances master clock 1041 from odd state 3 to even state 4 corresponding to the group of telephone office lines scanned by call data accumulator CDA1. Advancement of master clock 1041 to even state 4 applies a signal to lead MC4 extending to secondary clock enable 1040, FIG. 9, to enable an input of AND gate 10401, not shown. The other input of AND gate 10401 is connected in the manner of AND gate 10400 to the output of a register R10301, FIG. 3, associated with call data accumulator CDA1. In the present embodiment of the invention, it is assumed that only call data accumulators CDA0, CDA4, and CDA15 have scanned call handling telephone office lines. Remaining ones of call data accumulators CDA0 through CDA15 are assumed to have continued scanning groups of telephone office lines looking for call handling ones of the lines. Registers associated with call data accumulators having not scanned call handling telephone office lines remain in a reset state thereby inhibiting an input of their associated AND gates located in secondary clock enable 1040, FIG. 9. AND gate 10401, connected to enabled lead MC4, does not operate and OR gate 10416 maintains AND gate 10418 in the inhibit state to prevent enablement of secondary clock start lead ST5. Thus, the advancement of master clock 1041 to an even numbered state, such as state 4, defining a group of telephone office lines not handling telephone calls, does not start the secondary clock to initiate the telephone office identification sequence. Succeeding cycles of tone signal appearing on lead OSC continue to advance master clock 1041, FIGS. 4 and 5, from state 4 through odd and even states 5, 6, 7, 8 and 9. Since even states 6 and 8 define groups of telephone office lines that have been assumed not to be serving calling telephone stations, secondary clock 1044 is not activated and master clock 1041 continues to advance in response to oscillator 110 to even state 10 defining the group of telephone office lines scanned by call data accumulator CDA4.

Figure 9:
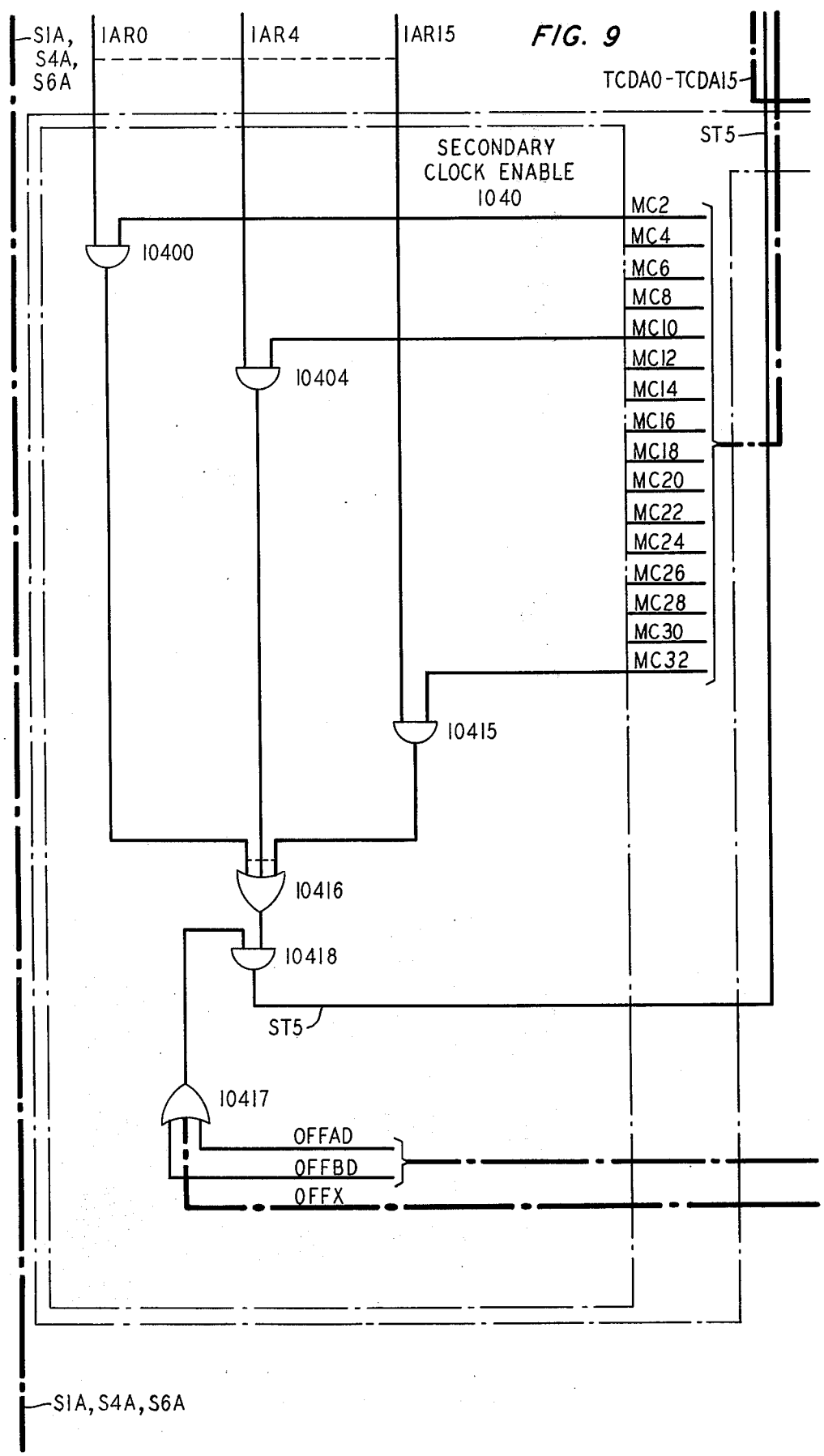

Advancement of master clock 1041 to state 10 enables lead MC10 extending to address decoder 10411, and to AND gate 10404 of secondary clock enable 1040, FIG. 9. Register R10304, FIG. 3, having previously been set by call data accumulator CDA4, in combination with the enabling signal appearing on lead MC10, FIG. 9, operates AND gate 10404 to cause OR gate 10416 to enable an input to AND gate 10418. Since the other input of AND gate 10418 is enabled by OR gate 10417, AND gate 10418 responds by enabling secondary clock start lead ST5.

Address decoder 10411, FIGS. 4 and 5, responds to the enabling signal appearing on lead MC10 by decoding the signal into the address of call data accumulator CDA4 and applying the address signals to leads AD1 through AD4. Secondary clock 1044 responds to the cycles of tone signal appearing on lead OSC by advancing from state 0 through state 15. As secondary clock 1044 advances, register 10410 is set to enable AND gate 112 in order that oscillator 110 may apply 10 cycles of tone signal to lead TT4 under control of multiplex 111 in response to the address signals appearing on leads AD1 through AD4.

Referring now to FIGS. 1 and 2, the 10 cycles of tone signal appearing on lead TT4 is applied over a path extending through the make portion of transfer contacts R4-1 and over sleeve lead S4 of call handling telephone office line T4, R4, S4 to terminal S413 on main distributing signal MDF2 and over lead S4A to telephone office 4 station identifier 34. Telephone office 4 station identifier 34, FIGS. 10 and 11, translates the 10 cycles of tone signal into four tone signals of 10 cycles each individually applied to leads THO, H3, T4, and U1 to identify the last four directory number digits 0341 assigned calling telephone station 13. The 10 cycles of tone signal appearing on units lead U1 is transmitted through make contacts OA8-41 of operated relay OA8 and over units lead 1U1 from selector 8 to tone detector 10031, FIG. 8.

In the aforementioned manner, tone detector 10031, under control of secondary clock enabling signals successively appearing on leads SC1 through SC10, decodes the 10 cycles of tone signals appearing on lead 1U1 into a digital signal that is applied to units lead UA1. The digital signal appearing on lead UA1 is entered into memory 1027, FIG. 7, by memory address write 1020 under control of a secondary clock enabling signal on lead SC12 into the call data accumulator CDA4 store location defined by signals appearing on leads OFFA and AD1 through AD4 as the identity of telephone office 4 serving calling telephone station 13. When secondary clock 1044, FIGS. 4 and 5, recycles to initial state 0, the enabling signal appearing on lead SCO enables AND gate 1042 in order that oscillator 110 may continue the advance of master clock 1041. Master clock 1041 continues to advance from state 10 through odd and even clock states without starting the secondary clock to state 32 defining the group of telephone office lines scanned by call data accumulator CDA15. Upon advancing to state 32, master clock 1041 enables lead MC32 extending to address decoder 10411 and to secondary clock enable 1040, FIG. 9. Recalling that register R10315, FIG. 3, has been previously set, AND gate 10415, FIG. 9, responds to the enabling of lead MC32 by operating OR gate 10416 which in combination with OR gate 10417 allows AND gate 10418 to enable secondary clock start lead ST5.

AND gate 1048, FIGS. 4 and 5, responds to the enabling of lead ST5 and the cycles of tone signal appearing on lead OSC by advancing secondary clock 1044 through state 0 through 15. In the aforementioned manner, secondary clock 1044 sets register R10410 to enable oscillator 110, via AND gate 112 and multiplex switch 111, to apply ten cycles of tone signal to lead TT15. The ten cycles of tone signal, FIGS. 1 and 2, is applied through the make portion of operated transfer contacts R15-1 over sleeve lead S6 and main distributing frame terminal S1614 to lead S6A. The 10 cycles of tone signal appearing on lead S6A, FIGS. 10 and 11, is translated into four tone signals of 10 cycles each and individually applied to leads TH2, H4, T5, and U3 to identify the last four directory number digits 2453 assigned calling telephone station 14. At this time selector 8 has only received an enabling signal on lead OFFA and relays 6F8 and OB8 are released thereby preventing the coupling of telephone office 6 station identifier 36 with detector 100. Thus, office identity memory 102 is not enabled to record the identity of the telephone offices serving calling telephone station 14 and secondary clock 1044 is recycled to state 0 thereby again enabling master clock 1041, FIGS. 4 and 5.

Master clock 1041 continues to advance from state 32 through state 37 and is then recycled to state 0. The next cycle of tone signal appearing on lead OSC advances recycled master clock 1041 to state 1 and enables lead MC1 to advance office counter 10412 to state 2. The advancement of office counter 10412 from state 1 to state 2 transfers the enabling signal formerly on leads OFFA, OFFAD to lead OFFB. The enabling signal appearing on lead OFFB, FIG. 7, operates OR gate 1025 to enable an input of AND gate 1028 and OR gate 1023 to control memory position select 1021 to select the B portion of the memory 1027 storage locations assigned call data accumulators CDA0 through CDA15.

The transfer of the office counter enabling signal from lead OFFA to OFFB, FIGS. 10 and 11, results in the release of relay OA8 and the operation of OB8 of selector 8. Relay OB8 in operating connects leads THO through TH9 of telephone office 5 station identifier 35 through respective make contacts OB8-10 through OB8-19 with corresponding ones of leads 1TH0 through 1TH9 extending to detector 100. In addition, leads HO through H9 of telephone office 6 station identifier 36 and leads TO through T9 of telephone office 7 station identifier 37 are connected through ones of make contacts OB8-20 through OB8-39 with corresponding ones of output leads 1HO through 1H9 and 1TO through 1T9.

Recycled master clock 1041, FIGS. 4 and 5, continues to advance to state 2 defining the group of telephone office lines scanned by call data accumulator CDA0 and again enables lead MC2. Secondary clock enable 1040, in the aforementioned manner, places an enable signal on secondary clock start lead ST5. Secondary clock 1044 in combination with address decoder 10411 controls AND gate 112 and multiplex switch 111 of remote identifier 11 to again apply 10 cycles of tone to lead TTO extending to call data accumulator CDAO. The 10 cycles of tone signal appearing on lead S1A, FIG. 10, associated with calling telephone station 12, is translated by telephone office 1 station identifier 31 into 10 cycles of tone appearing on leads THO, H9, T7, and U0. Since the OA8 and 1F8 relays of selector 8 are released, no tone signal is received by tone detectors 1000 through 10039.

Secondary clock 1044, FIGS. 4 and 5, continues to advance through state 15 and upon recycling to state 0 enables master clock 1041, via lead SCO, to again advance in response to the cycles of tone signal appearing on lead OSC. Upon reaching state 10 identifying the group of telephone office lines scanned by call data accumulator CDA4, master clock 1041 enables lead MC10 which in turn controls secondary clock enable 1040 to start secondary clock 1044 and apply ten cycles of tone signal to lead S4 of telephone office line T4, R4, S4. Since selector 8, FIGS. 10 and 11, relays OA8 and 4F8 are released, no tone signal appears on any of the 40 output leads of selector 8 and recycled master clock 1041 continues to advance through odd and even states to state 32.

When reaching state 32 master clock 1041, FIGS. 4 and 5, enables lead MC32 which controls secondary clock enable 1040 to enable secondary clock start lead ST5 and address decoder 10411 to generate address signals on leads AD1 through AD4 identifying call data accumulator CDA15. The 10 cycles of tone signals applied to lead TT15 under control of secondary clock 1044 are translated by telephone office 6 station identifier 36, FIGS. 10 and 11, into ten cycles of tone signals appearing on leads TH2, H4, T5, and U3. The 10 cycles of tone signal appearing on lead H4 is connected through make contacts OB8-24 of operated relay OB8 and over lead 1H4 to tone detector 10014, FIG. 8, wherein the tone signal is decoded under control of enabling signals on leads SC1 through SC10 into a digital signal and applied to lead HA4. Office identity memory 102, FIG. 7, under control of address and enabling signals appearing respectively on leads AD1 through AD4, OFFB and SC12 enters the digital signal appearing on lead HA4 into the B portion of memory 1027 store location assigned call data accumulator CDA15 as the identity of telephone office 6 serving calling telephone station 14.

After identity of telephone office 6 has been recorded by office identity memory 102, secondary clock 1044 recycles to state 0 and enables master clock 1041, FIGS. 4 and 5, to continue to advance through odd and even states to state 37 and then recycles to initial state 0. Thus, in a first sequence of states having time lengths fixed by cycles of tone signal, cyclic master clock 1041 controls identification apparatus to selectively apply tone signals to telephone office lines serving calling telephone stations. The identification apparatus decodes the tone signals into digital signals and registers the digital signals as the identity of telephone offices currently serving a plurality of calling telephone stations.

F. Calling Telephone Station Identification

During states 1 and 2 defined by office counter 10412, FIGS. 4 and 5, as office OFFA and OFFB, master clock 1041 cycled through a plurality of even states defining groups of telephone office lines to identify telephone offices 1, 4, and 6 currently serving calling telephone stations 12, 13, 14. In a second sequence, master clock 1041 again cycles through even states denoting groups of telephone office lines to identify the directory numbers assigned calling telephone stations 12, 13, 14 served by previously identified telephone offices 1, 4, 6.

After identifying telephone offices serving calling telephone stations, cycling master clock 1041 initiates a second sequence to identify calling telephone stations by advancing to state 1 in response to a cycle of tone signal appearing on lead OSC. The resultant enabling of lead MC1 controls OR gate 1049 to reset the registers of tone detectors 1001 through 10039 and enables office counter 10412 to advance to state 3 identifying telephone office 1. The transfer of an enabling signal from leads OFFB, OFFBD to lead OFF1, operates OR gate 1026, FIG. 7, to enable an input of AND gate 10210 and operates selector 8 relay 1F8, FIGS. 10 and 11. Operation of relay 1F8 closes make contacts 1F8-10 through IF8-49 to connect the forty THO through TH9, HO through H9, TO through T9, and UO through U9 leads with corresponding leads 1TH0 through 1TH9, 1HO through 1H9, 1TO through 1T9, and 1UO through 1U9.

Master clock 1041, FIGS. 4 and 5, advances from state 1 to even state 2 and transfers the enabling signal from lead MC1 to MC2. The enabling signal appearing on lead MC2 controls address decoder 10411 to apply address signals identifying call data accumulator CDA0 to address leads AD1 through AD4 extending to both remote identifier 11 and office identifier memory 102, FIG. 7. Transfer of the enabling signal from odd numbered lead MC1 to even numbered lead MC2 inhibits OR gate 1049 of clock 104 to remove an enabling signal from lead MCODD. Inverter gate 13 responds to the removal of the enabling signal from lead MCODD by enabling an input of AND gate 10210 which in combination with the output of enabled OR gate 1026 operates AND gate 10210 to generate a read signal for memory read 1022. The read signal in combination with the address signals appearing on address labels AD1 through AD4 identify call data accumulator CDAO and enables memory read 1022 to read the identity of telephone office 1 from the call data accumulator CDAO store location in memory 1027. Signals corresponding to telephone office 1, previously identified as serving calling telephone station 12 coupled with the call handling telephone office line scanned by call data accumulator CDA0, are transmitted to match circuit 1029 and are compared with telephone office 1 signals generated by the enabling signal appearing on lead OFF1. When a match occurs, the identity of telephone office 1 is transmitted over cable OFFX to station number multiplex transmitter 101, FIG. 6, and secondary clock enable 1040, FIG. 9.

The telephone office 1 identity signal appearing on cable OFFX operates OR gate 10417 to enable an input of AND gate 10418. Recalling the enabling of lead MC2 by master clock 1041 and the setting of register R10300 to place an enabling signal on lead 1ARO, AND gate 10400 operates to enable OR gate 10416 and thereby control AND gate 10418 to place a secondary clock start signal on lead ST5. The advancement of secondary clock 1044 through 10 states enables lead SET1, FIGS 4 and 5, in order that the remote identifier 11 may, in accordance with the address signals appearing on address leads AD1 through AD4, again apply 10 cycles of tone signal to lead TTO.

The 10 cycles of tone signal applied to lead TTO appear on lead S1A, FIG. 10, and are translated by telephone office 1 station identifier 31 into 10 cycles of tone signals appearing on each of the 1THO, H9, T7, and UO leads identifying the last four digits of directory number 1-0970 assigned calling telephone station 12. The four tone signals are individually transmitted through make contacts 1F8-10, 1F8-29, 1F8-37 and 1F8-40 of operated relay IF8 over leads 1THO, 1H9, 1T7, and 1UO, FIG. 8, to tone detectors 1000, 10019, 10027, and 10030 of detector 100. As secondary clock 1044 advances through states 1 through 10, tone detectors 1000, 10019, 10027, 10030 respond to the enabling signals appearing on leads SC1 through SC10 by decoding the tone signals into digital signals applied to leads THA0, HA9, TA7, and UA0 extending to station number multiplex transmitter 101, FIG. 6.

The enabling signal appearing on lead OFF1D a short time after office counter 10412 has enabled lead OFF1 controls OR gate 1013 to enable an input of AND gate 1012. Advancement of secondary clock to state 12 enables lead SC12 to control binary coded decimal decoder 1010, in the well-known manner, to decode the telephone office 1 identity signals on cable OFFX and the digital signals on leads THA0, HA9, TA7, and UA0 into binary coded decimal digits representing the directory number 1-0970 assigned calling telephone station 12. The binary coded decimal digits 1-0970 are transmitted in a parallel code format to binary coded decimal serial load selector 1011 and, in response to the enabling signal on lead SC12, transmitted in a serially coded format over lead TCDA0 selected by the address signals on leads AD1 through AD4 to call data accumulator CDA0, FIG. 3. The directory number 1-0970 assigned calling telephone station 12 is recorded in call data accumulator CDA0 until required to be transmitted to a remote automatic message accounting recording center.

G. Sequence of Identifying Calling Telephone Stations

While office counter 10412, FIGS. 4 and 5, remains at state 3 corresponding to telephone office 1, master clock 1041 advances through states 1 through 37 identifying ones of the call data accumulators CDA0 through CDA15 that may have located telephone office 1 lines coupled to calling telephone stations. After advancing to state 37, master clock 1041 recycles, advances office counter 10412 to state 4 corresponding to telephone office 2, and again advances through states 1 through 37 identifying ones of the call data accumulators CDA0 through CDA15 that may have located telephone office 2 lines coupled to calling telephone stations. This telephone station identification sequence continues until the calling telephone stations served by each previously memory recorded telephone office have been identified. During the telephone station identification sequence, the directory number of each calling telephone station served by the telephone office recorded in memory is identified and serially transmitted to the appropriate call data accumulator.

After identifying the directory number 1-0970 assigned to calling telephone station 12, master clock 1041 advances from state 2 through odd and even states to state 10. The resultant enabling of lead MC10 controls address decoder 10411 to place the address of call data accumulator CDA4 on address leads AD1 through AD4 extending to office identity memory 102, FIG. 7. The previously enabling of lead OFF1 by office counter 10412 operated OR gate 1026 to enable an input of AND gate 10210. When master clock 1041 advanced to even state 10, the resultant inhibiting of lead MCODD controls inverter gate I3 to enable the other input of AND gate 10210. The write signal generated by AND gate 10210 enables memory read 1022 to read the identity of telephone office 4 from call data accumulator CDA4 store location defined by the address signals on leads AD1 through AD4 into match circuit 1029. Since the identity of telephone office 4 does not coincide with the identity of telephone office 1 generated by enabled lead OFF1, match circuit 1029 maintains lead OFFX in the inhibit state to prevent secondary clock enable 1040 from placing a signal on lead ST5 to start secondary clock 1044.

Master clock 1041, FIGS. 4 and 5, continues, to respond to the cycles of tone signal appearing on lead OSC by advancing from state 10 to state 37. Upon reaching state 37, master clock 1041 is recycled to state 0 and continues to advance to state 1 by enabling lead MC1 to advance office counter 10412 to state 4 identifying telephone office 2. Recycled master clock 1041 continues to advance again through states 2 through 32 in order to identify calling telephone stations coupled with the telephone office 2 lines that may have been scanned by call data accumulator CDA0 through CDA15. Upon reaching state 37, master clock 1041 again recycles to state 0 and advances to state 1.

Lead MC1 is enabled to advance office counter 10412 to state 5 identifying telephone office 3. Master clock 1041 again cycles through states 2 through 32 to identify calling telephone stations coupled with telephone office 3 lines scanned by each call data accumulator. After recycling again, master clock 1041 enables lead MC1, at state 1, to advance office counter 10412 to state 6 identifying telephone office 4.

Office counter 10412, in advancing to state 6, enables lead OFF4 extending to office identity memory 102, FIG. 7, and to selector 8, FIGS. 10 and 11. The enabling signal appearing on lead OFF4 operates relay 4F8 to individually connect the 40 leads TH0 through TH9, H0 through H9, T0 through T9, and U0 through U9 of telephone office 4 station identifier 34 with the corresponding forty output leads 1TH0 through 1TH9, 1H0 through 1H9, 1T0 through 1T9, and 1U9 extending to detector 100.

The signal appearing on lead OFF4, FIG. 7, also controls OR gate 1026 to enable an input of AND gate 10210 and thereby control match circuit 1029 to generate the identity of telephone office 4. Advancement of master clock 1041 to even state 10 controls address decoder 10411 to apply the address of call data accumulator CDA4 to address leads AD1 through AD4 and inhibits lead MCODD. Inverter gate I3 responds to the inhibit signal appearing on lead MCODD by enabling AND gate 10210 to control memory read 1022 to read the identity of telephone office 4 into match circuit 1029 from the call data accumulator CDA4 store location identified by address leads AD1 through AD4. Since there is a match, lead OFFX is enabled to transmit the identity telephone office 4 to station number multiplex transmitter 101 from match circuit 1029.

Enablement of lead OFFX controls secondary clock enable 1040 to apply a start signal to lead ST5. Secondary clock 1044 responds to the start signal by cycling through ten states and thereby enabling remote identifier 11 to apply 10 cycles of tone signal over calling telephone station 13 sleeve lead connector S4A, FIGS. 10 and 11, to telephone office 4 station identifier 34. The tone signal on lead S4A is translated by telephone office 4 station identifier 34, decoded by the tone detectors of detector 100 and appears at the input of binary coded decimal decoder 1010, FIG. 6, as digital signals on leads THA0, HA3, TA4, and UA1. In the aforementioned manner, binary coded decimal decoder 1010 and binary coded decimal serial load selector 1011, under control of the signals appearing on leads SC12, OFF4D, and AD1 through AD4, decode the digital signals and lead OFFX signals into binary coded decimal signals corresponding to directory number 4-0341 assigned calling telephone station 13 and serially transmits them over lead TCDA4 for registration in call data accumulator CDA4.

The recycle of secondary clock 1044, FIGS. 4 and 5, to state 0 restarts master clock 1041 to continue the advance from state 10 through odd and even states to state 37. Master clock 1041 continues to cycle through ones of the states during the second sequence to locate ones of the telephone offices previously identified and recorded in office identity memory 102 as serving calling telephone stations coupled to telephone office lines. After advancing office counter 10412 through states identifying telephone office 5 and cycling through states 2 through 32, master clock 1041 recycles to state 0 and advances to state 1. The enabling signal appearing on lead MC1 advances office counter 10412 to state 8 which in turn places an enabling signal on lead OFF6. The enabling signal on lead OFF6 operates relay 6F8 of selector 8 to extend the output leads of telephone office 6 station identifier 36, FIGS. 10 and 11, to tone detectors 1001 through 10039 of detector 100.

Master clock 1041 advances from state 1 through odd and even states to state 32 and in so doing enables lead MC32. In the aforementioned manner address decoder 10411 responds to the signal on lead MC32 by generating address signals on lead AD1 through AD4 to enable office identity memory 102, FIGS. 7, to read the identity of telephone office 6 from memory and compare it with the telephone office identity generated by enabled lead OFF6. After match, the identity of telephone office 6 is transmitted over lead OFFX to station number multiplex transmitter 101 and to secondary clock enable 1040 to start secondary clock 1044. Secondary clock 1044 advances and on reaching state 12 enables station number multiplex transmitter 101, FIGS. 6, to serially transmit calling telephone station 14 directory number 6-2453 signals from signals appearing on lead OFFX and leads THA2, HA4, TA5, UA3 over lead TCDA15 to call data accumulator CDA15. The recycling of secondary clock 1044 to state 0 restarts master clock 1041.

H. Return to Idle

Master clock 1041, FIGS. 4 and 5, continues to advance and upon recycling and advancing to state 1 enables lead MC1 to advance office counter 10412 to state 9. The resulting enabling of lead OFF7, in addition to operating relay 7F8 of selector 8, FIG. 10, initiates start of the reset sequence by enabling an input of AND gate 10415, FIGS. 4 and 5. Master clock 1041 continues to advance through states 2 to 32 to identify directory numbers of calling telephone stations served by telephone office 7. Master clock 1041 in continuing to advance enables lead MC36 to operate AND gate 10415 and reset register R10414.

AND gate 10415, in addition to enabling register R10414, enables lead RESET to clear registers 10300 through 10315, FIG. 3, of input request 103. Master clock 1041, FIGS. 4 and 5, advances from state 36 to state 37 and enables lead MC37 extending to AND gate 10413. AND gate 10413, in response to the signal on lead MC37 and the signal generated by set register R10414, enables lead MRESET to concurrently set master clock 1041, secondary clock 1044, and office counter 10412 to initial state 0. With the clock circuitry of clock 104 set to the 0 states and the registers of input request 103 reset, the telephone station identification system remains in the idle state awaiting next telephone station identification requests from telephone offices of the switching system.

It is obvious from the foregoing that the facility, economy, and efficiency of identifying telephone stations may be substantially enhanced by the provision of a time division multiplex telephone station identification system arranged to identify a plurality of telephone stations currently served by a plurality of telephone offices. It is further obvious from the foregoing that the present telephone identification system arrangement for first identifying telephone offices serving active telephone stations and for sequentially generating the directory numbers of active telephone stations served by the identified telephone offices alleviates the need for conducting a time consuming search by sequentially stepping through the telephone station identification equipment of every telephone office to locate and identify each calling telephone station served by one telephone office.

While the equipment of the present invention has been disclosed in a step-by-step switching system it is to be understood that such an embodiment is intended to be illustrative of the principles of the invention and that numerous other arrangements utilizing the instant telephone station identification system may be devised by those skilled in the art without departing from the spirit and scope of the invention.

For example, the present telephone station identification system can be provided for use with crossbar, electronic, and other types of telephone or station switching systems. It is also possible to use the present telephone station identification system at a central location to identify directory numbers of telephone stations served by a plurality of telephone offices each located remotely with respect to the central location. It is furthermore possible that the present telephone station identification system may be utilized to generate the three digit NNX code usually assigned each telephone office of a switching system in combination with the four digit directory number assigned each telephone station served by the telephone office.

What is claimed is:

1. An identification system for use with telephone stations of a plurality of telephone offices comprising
    means having input and output leads and responsive to an input signal appearing on one of the input leads for translating the input signal into output signals on thousands, hundreds, tens, and units ones of the output leads,
    means for identifying ones of the telephone offices currently serving telephone stations in accordance with a first output signal appearing on one of the thousands, hundreds, tens, and units output leads of said translating means, and
    means for generating the identity of each telephone station served by the identified telephone offices in accordance with subsequent output signals appearing on the thousands, hundreds, tens, and units output leads of said translating means.

2. The identification system set forth in claim 1 further comprising
    means for defining first and second sequences of timed enabling signals,
    means controlled by ones of the timed enabling signals for applying the input signal to ones of the input leads associated with served telephone stations.

3. The identification system set forth in claim 2 wherein said identifying means comprises
    means responsive to said defining means and to the first sequence of timed enabling signals for recording the output signals appearing on one of the one thousands, hundreds, tens, and units output leads as identities of the serving telephone offices.

4. The identification system set forth in claim 3 wherein said generating means comprises
    means responsive to said defining means and said recording means for decoding combinations of the output signals appearing on the thousands, hundreds, tens, and units output leads during the second sequence of timed enabling signals into the identity of each telephone station currently served by the identified telephone offices.

5. A system for identifying telephone stations coupled to lines of a plurality of telephone offices comprising means for defining first and second sequences of enabling signals, means for applying a signal to ones of the telephone office lines coupled with served ones of the telephone stations, means having input and output leads and responsive to the applied signal appearing on one of the input leads for translating the applied signal into output signals on ones of the output leads, means enabled by said defining means for identifying ones of the telephone offices currently serving telephone stations in accordance with a first output signal appearing on one of the output leads, and means enabled by said defining means for generating the identity of each telephone station served by the identified telephone offices in accordance with subsequent combinations of output signals appearing on ones of the output leads.

6. The identifying system set forth in claim 5 wherein said defining means comprises means for generating a tone signal, master counting means for generating first enabling signals in accordance with cycles of the tone signal, secondary counting means for generating second enabling signals in accordance with the cycles of tone signal, and office counting means enabled by said master counting means for generating office enabling signals defining first and second sequences of the first enabling signals.

7. The identifying system set forth in claim 6 wherein said applying means comprises means for scanning groups of the telephone office lines, means for registering call signals denoting ones of the scanned telephone office lines coupled to the served telephone stations, and means enabled by said registering means for transmitting a start signal to said master counting means.

8. The identifying system set forth in claim 7 wherein said applying means also comprises means enabled by ones of the first enabling signals for deriving address signals identifying each scanned group of telephone office lines, and means enabled by said address deriving means and secondary counting means for controlling said generating means to apply a predetermined number of cycles of the tone signal to serving telephone office lines.

9. The identifying system set forth in claim 8 wherein said translating means comprises a plurality of identifiers having input leads associated with the telephone stations and output leads and each responsive to the tone signal appearing on one of the input leads for translating the tone signal into a plurality of tone signals on thousands, hundreds, tens, and units ones of the output leads, first means enabled by first ones of the office enabling signals for simultaneously selecting the thousands leads of a first identifier, the hundreds leads of a second identifier, the tens leads of a third identifier, and the units leads of a fourth identifier, and second means enabled by second ones of the office enabling signals for simultaneously selecting the thousands, hundreds, tens, and units output leads of each identifier.

10. The identifying system set forth in claim 9 wherein said translating means also comprises means having a plurality of digit output leads and sequentially enabled by ones of said first enabling signals for decoding the cycles of tone signal appearing on ones of the selected identifier thousands, hundreds, tens, and units output leads into digital signals applied to corresponding thousands, hundreds, tens, and units ones of the digit output leads.

11. The identification system set forth in claim 10 wherein said identifying means comprises means responsive to the address signals in combination with the first office enabling signals for recording digital signals appearing on one of the thousands, hundreds, tens, and units digit output leads as identities of telephone offices currently serving telephone stations, and means responsive to the address signals in combination with the second office enabling signals for reading the telephone office identities from said recording means.

12. The identification system set forth in claim 11 wherein said generating means comprises means coupled to said decoding means and said reading means and enabled by the second office enabling signals and one of second enabling signals for encoding combinations of digital signals appearing on the thousands, hundreds, tens, and units digit output leads into the identities of telephone stations served by each identified telephone office.

13. The identification system set forth in claim 12 further comprising means coupled to said encoding means and enabled by the address signals for selecting ones of said scanning means and serially transmitting thereto directory number digit signals for each telephone station served by the identified telephone offices.

14. A system for identifying directory numbers of telephone stations coupled to lines of a plurality of telephone offices comprising scanner means for scanning groups of the telephone office lines, register means for registering call signals generated by said scanner means denoting ones of the telephone office lines connected to served telephone stations, oscillator means for generating a tone signal, counter means enabled by said register means for generating enabling signals in accordance with cycles of the tone signal, address means enabled by first ones of the enabling signals for deriving address signals identifying the scanned groups of telephone office lines, multiplex means enabled by the address signals and second ones of the enabling signals for controlling said oscillator means to apply a predetermined number of cycles of the tone signal to the telephone office lines, identifier means having input leads associated with the telephone stations and output leads and responsive to the tone signal appearing on one of the input leads for translating the tone signal into a plurality of tone signals on thousands, hundreds, tens, and unit ones of the output leads, first selector means enabled by third ones of the enabling signals for selecting the thousands output leads, the hundreds output leads, the tens output leads, and the units output leads, respectively, of first, second, third and fourth ones of said identifier means, second selector means sequentially enabled by fourth ones of the enabling signals for selecting the thousands, hundreds, tens, and units output leads of each one of the identifier means, decoder means having digit output leads and sequentially enabled by the second enabling signals for decoding the cycles of tone signal appearing on the selected thousands, hundreds, tens, and unit output leads into digital signals applied to corresponding thousands, hundreds, tens, and units ones of the digit output leads, memory means responsive to the third enabling signals and to the address signals for recording a digital signal appearing on one of the thousands, hundreds, tens, and units digit output leads of said first, second, third and fourth identifier means as identifies of telephone offices currently serving telephone stations, and means coupled to said decoder means and to said memory means and enabled by the fourth enabling signals for identifying directory numbers assigned telephone stations served by identified telephone offices in accordance with combinations of digital signals on the selected output leads of each identifier means.

15. The identifying system set forth in claim 14 wherein said counter means comprises
a master cyclic counter for counting cycles of the tone signal as ones of a fixed number of first counting states identifying the first enabling signals,
a secondary cyclic counter for counting cycles of the tone signal as ones of a fixed number of second counting states identifying the second enabling signals,
a counter for counting a predetermined one of the first enabling signals as ones of a fixed number of third counting states identifying the third and fourth enabling signals, and
means enabled by a start signal generated by said register means for enabling said master cyclic counter to cycle through the first counting states.

16. The identifying system set forth in claim 15 wherein said counter means also comprises
control means responsive to said register means and enabled by ones of the first enabling signals signifying telephone office lines connected to served telephone stations for inhibiting said master cyclic counter and enabling said secondary cyclic counter.

17. The identifying system set forth in claim 16 wherein said identifying system further comprises
logic means responsive to a last one of the fourth enabling signals occurring in combination with final ones of the first enabling signals for initializing said counter means and said register means to restore the identifying system to an idle state.

18. An identification system for identifying directory numbers of telephone stations of a plurality of telephone offices each assigned a unique office code, the system comprising a plurality of identifier circuits each associated with one of the telephone offices,
memory means,
means coupled to a plurality of said identifier circuits during a first time sequence for detecting and recording in said memory means identities of ones of the telephone offices currently serving active ones of the telephone stations, and
means coupled to individual ones of said identifier circuits during a second time sequence and enabled by said memory means for generating the telephone office code and directory number assigned each active telephone station currently served by the identified telephone offices.

19. The identification system set forth in claim 18 further comprising
first cyclic means for generating first enabling signals ones of which identify groups of the telephone office lines,
second cyclic means for generating second enabling signals, and
counter means advanced by one of the first enabling signals for generating first and second sequences of office enabling signals, the first sequence identifying groups of the telephone offices and the second sequence identifying individual telephone offices.

20. The identification system set forth in claim 19 wherein each of the identifier circuits includes input leads associated with telephone stations of the associated telephone office and output leads and wherein each is arranged to translate a signal appearing on an input lead into output signals applied to thousands, hundreds, tens, and units ones of the output leads.

21. The identification system set forth in claim 20 wherein said memory means comprises
a memory for recording ones of the output signals in a plurality of memory store locations,
memory address means having input leads and responsive to the first enabling signals occurring in combination with the first sequence of office enabling signals for writing signals occurring on one of the input leads into selected ones of the memory store locations, and
means responsive to the first enabling signals occurring in combination with the second sequence of office enabling signals for reading signals denoting identified telephone office codes from the selected memory store locations.

22. The identification system set forth in claim 21 comprising
first selector means enabled by the first sequence of office enabling signals for simultaneously coupling the thousands leads of a first identifier circuit, the hundreds output leads of a second identifier circuit, the tens leads of a third identifier circuit and the units lead of a fourth identifier circuit with the input leads of said memory address means, and
second selector means enabled by the second sequence of office enabling signals for coupling the thousands, hundreds, tens and units output leads of each identifier circuit with said generating means.

23. An arrangement for identifying telephone stations by the application of a signal selectively applied to the lines of a plurality of telephone offices comprising
a plurality of identifier circuits each having input leads associated with the telephone stations and output leads and each responsive to the applied signal appearing on one of the input leads for generating output signals on thousands, hundreds, tens, and units ones of the output leads, means for registering one of the output signals on a thousands lead of a first identifier circuit, a hundreds lead of a second identifier circuit, a tens lead of a third identifier circuit, and a units lead of a fourth identifier circuit as the identities of telephone offices currently serving the telephone stations, and means for sequentially identifying telephone stations currently served by each identified telephone office in accordance with combinations of the output signals appearing on the thousands, hundreds, tens, and units leads of each identifier circuit associated with the serving telephone office.

24. A system for identifying directory numbers assigned telephone stations selectively coupled to lines of a plurality of telephone offices of a switching system comprising means for selectively scanning groups of the telephone office lines to locate ones of the lines connected to calling ones of the telephone stations, means enabled by said scanning means for registering call signals denoting connection of a line of each scanned group of telephone office lines with a calling telephone station, means enabled by the registration of ones of the call signals for deriving a start signal, means responsive to the start signal for generating first and second sequences of enabling signals, means enabled by said generating means for selectively applying a tone signal to ones of the scanned telephone office lines connected to calling telephone stations, means responsive to the applied tone signal for decoding the tone signal into a plurality of digital signals, means enabled by said generating means during the first sequence of enabling signals for registering one of the digital signals as the identity of a telephone office serving ones of the calling telephone stations, and means enabled by said generating means during the second sequence of enabling signals for identifying combinations of the digital signals as the directory number assigned each calling telephone station served by the telephone offices identified during the first sequence of enabling signals.

* * * * *